US012437541B1

United States Patent
Scanlon et al.

(10) Patent No.: US 12,437,541 B1
(45) Date of Patent: Oct. 7, 2025

(54) SYSTEMS AND METHODS FOR MIXED REALITY (MR) AND ARTIFICIAL INTELLIGENCE (AI)-ENHANCED FIRE INVESTIGATION

(71) Applicant: The Travelers Indemnity Company, Hartford, CT (US)

(72) Inventors: Ryan M. Scanlon, East Hampton, CT (US); Douglas L. Roy, Plantsville, CT (US); Reyer D. Swengel, Saint Paul, MN (US); Ryan M. Malone, Sturbridge, MA (US); Pee T. Lim, Middletown, CT (US); Keira R. Skenandore, Woodbury, MN (US)

(73) Assignee: The Travelers Indemnity Company, Hartford, CT (US)

( * ) Notice: Subject to any disclaimer, the term of this patent is extended or adjusted under 35 U.S.C. 154(b) by 155 days.

(21) Appl. No.: 18/504,082

(22) Filed: Nov. 7, 2023

(51) Int. Cl.
| | |
|---|---|
| *G06V 20/50* | (2022.01) |
| *G06T 7/73* | (2017.01) |
| *G06T 17/20* | (2006.01) |
| *G06T 19/00* | (2011.01) |
| *G06V 10/70* | (2022.01) |
| *G08B 17/12* | (2006.01) |

(52) U.S. Cl.
CPC ............. *G06V 20/50* (2022.01); *G06T 7/73* (2017.01); *G06T 17/20* (2013.01); *G06T 19/006* (2013.01); *G06V 10/70* (2022.01); *G08B 17/125* (2013.01); *G06T 2207/10028* (2013.01); *G06T 2207/20081* (2013.01); *G06T 2207/30196* (2013.01); *G06T 2207/30244* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2021/0019215 A1* | 1/2021 | Neeter | ............. | G06Q 10/06316 |
| 2022/0198753 A1* | 6/2022 | Sawhney | .................. | G06T 7/73 |

* cited by examiner

*Primary Examiner* — Frank S Chen
(74) *Attorney, Agent, or Firm* — RowanTree Law Group, PLLC; Carson C.K. Fincham

(57) ABSTRACT

A Mixed Reality (MR) and Artificial Intelligence (AI)-enhanced fire investigation system that analyzes data descriptive of fire-damaged locations, identifies objects of the location, creates a 3-D model of the location, automatically analyzes the location utilizing an AI fire investigation model, automatically analyzes the location utilizing an AI safety evaluation model, and automatically embeds and provides layered access to data assigned to the 3-D model.

18 Claims, 20 Drawing Sheets

520a 544a  546

SYSTEMS AND METHODS FOR MIXED REALITY (MR) AND ARTIFICIAL INTELLIGENCE (AI)-ENHANCED FIRE INVESTIGATION

BACKGROUND

Modern fire investigation techniques involve the recordation of large amounts of photographic data and notes or observations recorded by an experienced fire investigator. The photographs and notes are recorded throughout a typically lengthy on-site investigation and analysis visit by the investigator, with the primary goal being the determination of the origin and cause of the fire. Experienced fire investigators capable of recording the best information and with the knowledge to make the most accurate determinations are scarce, however, and the large amount of time required for analysis of any particular site decreases the rate at which they can process fire-damaged scenes. Further, as the photographs and notes are selected and stored by each individual fire investigator according to their own processes, post-recordation analysis by other analysts is severely hampered.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
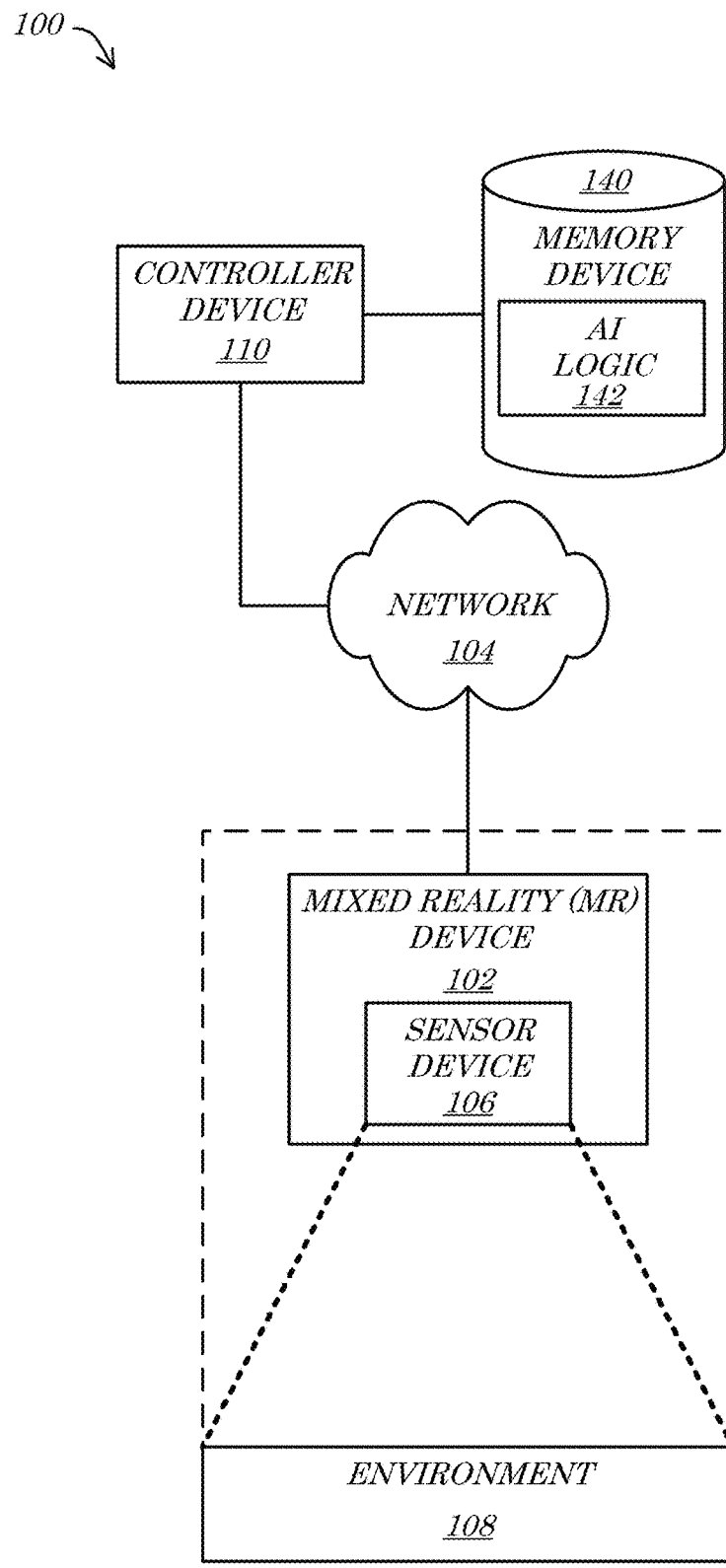
FIG. 1 is a block diagram of a system according to some embodiments.

Due to the limited availability of experienced fire investigators and the large amount of time required to train new investigators, fire investigation services are difficult to schedule and consume large amounts of time and resources to complete. Delays in fire investigation analysis cause further delays, inefficiencies, and loss of revenue for affected businesses, insurance claim processing, and legal investigations. Fire investigation records and final results are highly individualized to the particular fire investigator conducting the analysis, and are accordingly difficult to assess and/or reproduce by other personnel. Site analysis conducted by fire investigators is often inherently dangerous, as damaged structures may not be safe and/or air quality and/or other fire-related hazards may be present at the site (or portions thereof).

In accordance with embodiments herein, these and other deficiencies of existing systems are remedied by providing systems, apparatus, methods, and articles of manufacture for Mixed Reality (MR) and Artificial Intelligence (AI)-enhanced fire investigation. In some embodiments, for example, an MR/AI-based fire (and/or safety) investigation analysis system may utilize various sensors and wearable (e.g., head-mounted) computer hardware to: (i) acquire (e.g., by a Time of Flight (ToF) sensor and at a first time and from a first location in an environment in which a wearer of a head-mounted see-through display is located) data descriptive of first distances from an MR device to a first plurality of surface points in the environment (e.g., a fire-damaged environment), wherein the first plurality of surface points are within a first field of view of a camera, (ii) compute (e.g., by a processing device and utilizing the first distances and the first location) a first portion of a three-dimensional (3-D) point cloud descriptive of locations of the first plurality of surface points in the environment, (iii) track (e.g., after the acquiring of the first distances and/or by one or more Inertial Measurement Unit (IMU) devices) a first movement of a wearer from the first location in the environment to a second location in the environment, (iv) acquire (e.g., by the ToF sensor and at a second time and from the second location in the environment) data descriptive of second distances from the MR device to a second plurality of surface points in the environment, wherein the second plurality of surface points are within a second field of view of the camera, (v) compute (e.g., by the processing device and utilizing the first distances and the second location) a second portion of the 3-D point cloud descriptive of locations of the second plurality of surface points in the environment, (vi) generate (e.g., by the processing device and utilizing the first and second portions of the 3-D point cloud) a 3-D wire mesh model descriptive of the environment, (vii) receive (e.g., by a wireless communication device and from the sensor device) (a) data descriptive of the environment that has been captured by the sensor device and (b) positioning information descriptive of a location and orientation of the sensor device, (viii) identify (e.g., by the processing device and based on the positioning information descriptive of a location and orientation of the sensor device) a portion of the 3-D wire mesh model that corresponds to the data descriptive of the environment that has been captured by the sensor device, and (ix) assign (e.g., by the processing device and to the corresponding portion of the 3-D wire mesh model) an attribute representative of the data descriptive of the environment that has been captured by the sensor device. In such a manner, for example, data descriptive of a fire-damaged environment may be quickly and easily captured and stored (e.g., in a uniform and/or universal manner) and specific locations at the scene (e.g., in the environment) may be selectively and advantageously tagged with sensor information, readings, and/or additional data.

According to some embodiments, the MR/AI-based fire analysis system may utilize various sensors and wearable computer hardware to: (i) acquire (e.g., by the ToF sensor and at a first time and from a first location in the environment in which the wearer of the head-mounted see-through display is located) data descriptive of first distances from the MR device to a first plurality of surface points in the environment, wherein the first plurality of surface points are within a first field of view of the camera; (ii) compute (e.g., by the processing device and utilizing the first distances and the first location) a first portion of a 3-D point cloud descriptive of locations of the first plurality of surface points in the environment; (iii) track (e.g., after the acquiring of the first distances and by the one or more IMU devices) a first movement of the wearer from the first location in the environment to a second location in the environment; (iv) acquire (e.g., by the ToF sensor and at a second time and from the second location in the environment) data descriptive of second distances from the MR device to a second plurality of surface points in the environment, wherein the second plurality of surface points are within a second field of view of the camera; (v) compute (e.g., by the processing device and utilizing the first distances and the second location) a second portion of the 3-D point cloud descriptive of locations of the second plurality of surface points in the environment; (vi) generate (e.g., by the processing device and utilizing the first and second portions of the 3-D point cloud) a 3-D wire mesh model descriptive of the environment; (vii) identify (e.g., by the processing device and by an execution of an AI safety criteria model) a safety hazard in the environment; and (viii) output (e.g., via the head-mounted see-through display and to the wearer) an MR element that is indicative of the safety hazard. In such a manner, for example, the wearer (e.g., the fire investigator) may be dynamically alerted to safety hazards in the environment that the wearer alone may be unlikely to detect and/or appreciate.

In accordance with some embodiments, the application of MR/AI-based fire analysis processing, as described herein, may provide a reduction in computer processing resources, a reduction in necessary memory storage requirements, and other technical improvements with respect to existing systems that store large quantities of high-resolution photos. The particular MR/AI-based fire analysis systems and methods described herein may, for example, permit available wearable device processing and memory resources to be utilized to achieve accurate and detailed fire investigation analysis without requiring mass storage devices, large capital outlays, and/or specialized training. According to some embodiments, an untrained or minimally-trained end user may be guided through the data acquisition, fire investigation analysis, and/or data embedding and/or safety analysis processes via a remote telepresence session and/or AI-driven prompts (e.g., MR prompts). In such a manner, for example, specialized personnel may no longer be necessary to conduct every fire investigation analysis, greatly reducing costs, reducing the amount of time required to conduct fire investigation analysis and/or assessments, and/or reducing bandwidth constraints in electronic networks.

II. MR and AI-Enhanced Fire Investigation Systems

Referring first to FIG. 1, a block diagram of a system 100 according to some embodiments is shown. In some embodiments, the system 100 may comprise a user device (e.g., MR device) 102 communicatively coupled to a network 104. In some embodiments, the MR device 102 may comprise one or more sensor devices 106, such as an imaging and/or other input device, that is disposed to capture data descriptive of an environment 108. According to some embodiments, the sensor device 106 and/or the MR device 102 may be in communication with (e.g., via the network 104) and/or may provide indications of the data to a controller device 110. According to some embodiments, the controller device 110 and/or the MR device 102 may be in communication with (e.g., via the network 104) a memory device 140 (e.g., storing AI logic 142). In accordance with various embodiments herein, the MR device 102 and/or the sensor device 106 may be utilized to direct, manage, and/or define the capture of imagery (and/or other sensor data) of the environment 108 and/or the one or more objects (not separately shown) thereof. In some embodiments, the imagery/data captured by the sensor device 106 may be provided from the MR device 102 to the controller device 110 for imagery/sensor data analysis and execution of stored analysis rules and/or logic (e.g., the AI logic 142). In such a manner, for example, data descriptive of the objects (e.g., surfaces, features, attributes, etc.) may be input into the system 100 and utilized to identify/classify the objects and/or to evaluate the environment 108. In some embodiments, the AI logic 142 and/or the memory device 140 may reside in and/or form part of the MR device 102. According to some embodiments, the MR device 102 may be utilized to tag and/or otherwise assign or associate sensor data with one or more objects, portions, and/or locations (e.g., points, lines, and/or areas) of the environment 108. In such a manner, for example, various forms and/or tiers or layers of data may be automatically embedded and/or linked to locations within the environment 108. According to some embodiments, the AI logic 142 may be utilized to identify, classify, and/or provide safety warnings to an operator (not separately shown) of the MR device 102, e.g., with respect to a hazard detected in the environment 108.

Figure 6:
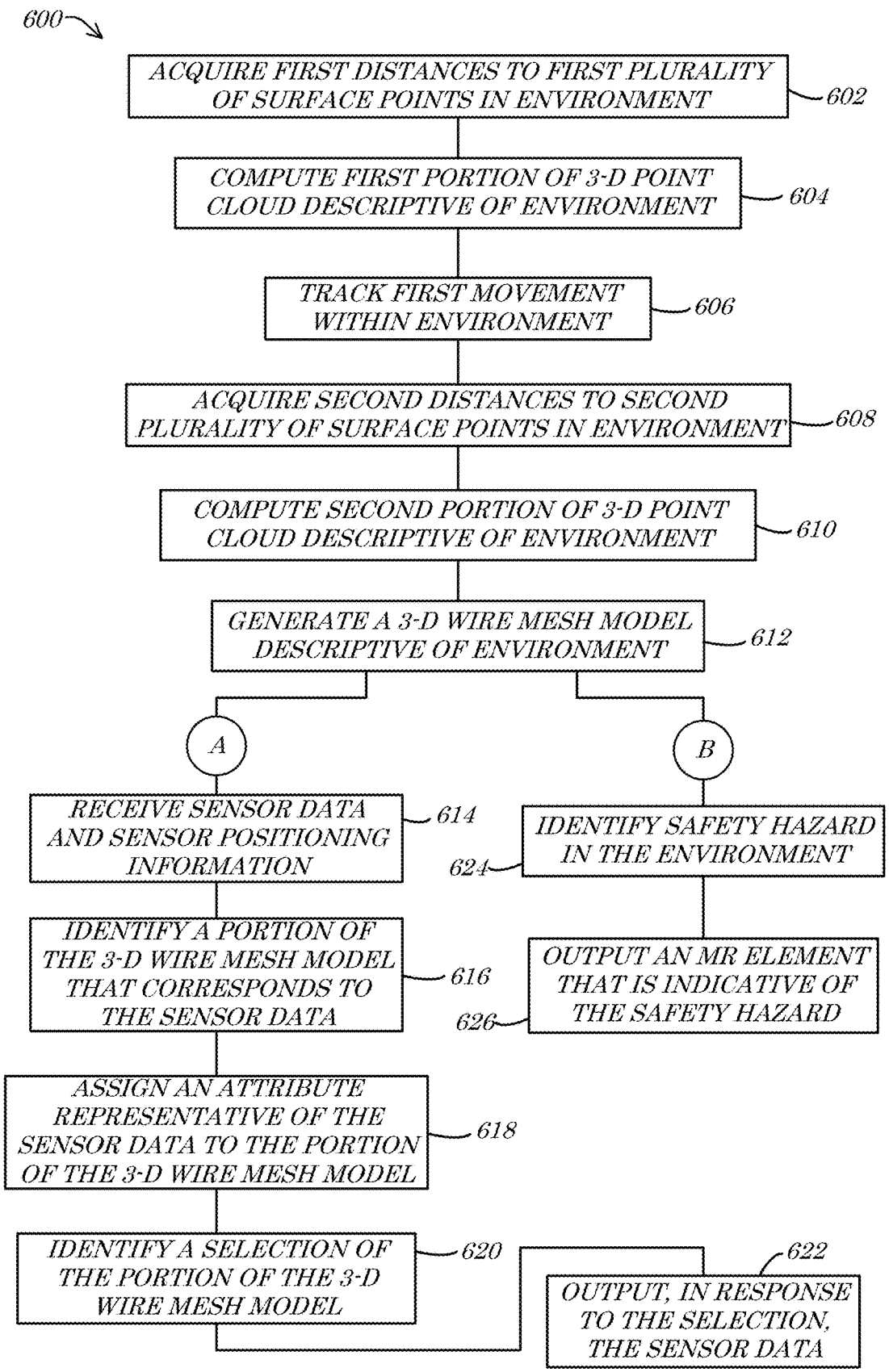
FIG. 6 is a flow diagram of a method according to some embodiments.

Fewer or more components 102, 104, 106, 108, 110, 140, 142 and/or various configurations of the depicted components 102, 104, 106, 108, 110, 140, 142 may be included in the system 100 without deviating from the scope of embodiments described herein. In some embodiments, the components 102, 104, 106, 108, 110, 140, 142 may be similar in configuration and/or functionality to similarly named and/or numbered components as described herein. In some embodiments, the system 100 (and/or portions thereof) may comprise an automatic MR/AI-based fire analysis program, system, and/or platform programmed and/or otherwise configured to execute, conduct, and/or facilitate the method 600 of FIG. 6 herein, and/or portions thereof.

According to some embodiments, the MR device 102 may comprise any type or configuration of device, sensor, and/or system that is capable of capturing imagery and/or other data descriptive of the environment 108 and/or the objects, portions, and/or attributes thereof. The MR device 102 may, in some embodiments, comprise a wearable computing device that provides MR capabilities to a wearer thereof. The MR device 102 may, for example, comprise a Magic Leap 2™ wearable MR unit available from Magic Leap, Inc. of Plantation, FL. The Magic Leap 2™ comprises an electronic processing device, a built-in memory device (e.g., two hundred and fifty-six Gigabyte (256 GB)), a twelve point six Megapixel (12.6 MP) autofocus Red-Green-Blue (RGB) video camera (e.g., with a seventy degree field of View (70° FoV)), built-in audio speakers, four (4) IMU sensors (e.g., three-axis (3-axis) accelerometer and gyroscope; two (2) three-axis (3-axis) magnetometers; and two (2) altimeters), a see-through display (e.g., head-mounted, with one thousand four hundred forty by one thousand seven hundred sixty pixel (1440×1760) resolution and twenty to two thousand nits (20-2000) brightness, and a battery providing power to the various components. In some embodiments, the MR device 102 may comprise a wireless communication device (e.g., for communications via the network 104) and/or a paired hand-held controller/pointer device (e.g., six (6)-degrees of freedom). In some embodiments, the sensor device 106 may comprise and/or include any or all of the input devices of the MR device 102.

The network 104 may, according to some embodiments, comprise a Local Area Network (LAN; wireless and/or wired), cellular telephone, Bluetooth® and/or Bluetooth® Low Energy (BLE), Near Field Communication (NFC), and/or Radio Frequency (RF) network with communication links between the controller device 110, the MR device 102, the sensor device 106, and/or the memory device 140. In some embodiments, the network 104 may comprise direct communications links between any or all of the components 102, 106, 110, 140 of the system 100. The sensor device 106 may, for example, be directly interfaced or connected to the MR device 102 via one or more wires, cables, wireless links, and/or other network components, such network components (e.g., communication links) comprising portions of the network 104. In some embodiments, the network 104 may comprise one or many other links or network components other than those depicted in FIG. 1. The sensor device 106 and/or the MR device 102 may, for example, be connected to the controller device 110 via various cell towers, routers, repeaters, ports, switches, and/or other network components that comprise the Internet and/or a cellular telephone (and/or Public Switched Telephone Network (PSTN) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 106, 110, 140 of the system 100. The network 104 may comprise one or more cellular telephone networks with communication links between the sensor device 106 and the controller device 110, for example, and/or may comprise a BLE, NFC, RF, and/or "personal" network comprising short-range wireless communications between the sensor device 106 and the MR device 102, for example.

The sensor device 106, in some embodiments, may comprise any type or configuration of device, sensor, and/or object that is capable of capturing imagery and/or other data descriptive of the environment 108 and/or the objects, portions, and/or attributes thereof. The sensor device 106 may comprise, for example, a camera (e.g., coupled to and/or integral with the MR device 102), such as the Pro 12MP or Dual 12MP camera available on the iPhone® 12 Pro or iPhone® 12, respectively, manufactured by Apple®, Inc. of Cupertino, CA) and/or a ranging device, such as a Light Detection and Ranging (LiDAR) device. In some embodiments, the sensor device 106 may comprise a stand-alone device (e.g., separate from the MR device 102), such as a Digital Single-Lens Reflex (DSLR) camera, such as a Nikon® D6™ DSLR with twenty point eight Megapixels (20.8 MP), built-in Wi-Fi® and Bluetooth®, and available from the Nikon Corporation of Tokyo, Japan. In some embodiments, the sensor device 106 may comprise a multispectral imaging device capable of capturing three- or four-band imagery data (e.g., RGB plus Near IR). The imagery and/or other data captured by the sensor device 106 may generally comprise any type, quantity, and/or format of photographic, video, and/or other sensor data descriptive of the environment 108 and/or the objects, portions, and/or attributes thereof. According to some embodiments, the data captured and/or acquired by the sensor device 106 may comprise one or more images (still, and/or video frames) captured from different positions and/or locations in or proximate to and/or in the environment 108, such as a plurality of individual images taken at different bearings and/or elevations from a given position.

In some embodiments, the sensor device 106 may also or alternatively comprise a server and/or datastore (e.g., the controller 110 and/or the memory device 140) that is configured to provide the imagery and/or other data descriptive of the environment 108. The sensor device 106 may comprise, for example, a third-party and/or vendor device configured to supply imagery and/or other sensor data acquired from various cameras, sensors, and/or other sources. According to some embodiments, the sensor device 106 may comprise the MR device 102 incorporating sensor and MR capabilities, such as any type or configuration of computing, mobile electronic, network, user, and/or communication device that is or becomes known or practicable. The sensor device 106 may, in some embodiments, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA.

In some embodiments, the sensor device 106 may comprise one or more devices owned and/or operated by one or more users, such as a remote worker (e.g., a fire investigator), employee, etc. According to some embodiments, the sensor device 106 may communicate with the controller device 110 via the network 104 to provide imagery and/or other data captured by the sensor device 106 for analysis and/or assessment of the environment 108, as described herein. According to some embodiments, the sensor device 106 may store and/or execute specially programmed instructions (such as a mobile device application) to operate in accordance with embodiments described herein. The sensor device 106 may, for example, execute one or more mobile device programs that activate and/or control the sensor device 106 and/or that analyze imagery and/or other data of the environment 108, e.g., to identify, locate, and/or classify one or more of the objects, portions, and/or attributes of the environment 108, identify one or more rules associated with the environment 108 (e.g., safety rules), evaluate the one or more rules, compute a fire and/or safety assessment based on the evaluation of the rules, and/or provide output to guide the user/wearer through the environment 108.

According to some embodiments, the environment 108 may comprise any location desired for fire investigation analysis and/or assessment, such as a location that has experienced fire damage (real or simulated). In some embodiments, the environment 108 may be identified by one or more location parameters, such as an address, postal code, map quadrant, a particular building and/or structure, a room, and/or one or more coordinates and/or other identifiers (e.g., a unique georeferenced location identifier, such as latitude and longitude coordinates and/or a Global Positioning System (GPS) coordinate). According to some embodiments, the environment 108 may comprise the one or more objects, portions, locations, areas, and/or attributes. In the case that the environment 108 comprises a room (or other interior structural space), for example, the objects may comprise various furnishings (e.g., moveable objects, such as couches (e.g., sofas), chairs, tables, lamps, rugs, etc.), materials, such as flooring or wall coverings (e.g., structural finishing), fixtures (e.g., plumbing, electrical, and/or other fixtures), work devices (such as computers, peripherals, input devices, output devices, tools, and/or machinery), and/or features, such as windows, doors, doorways, niches, coffers, stairways, fireplaces, etc. According to some embodiments, the environment 108 may be identified by a unique identifier and/or code that is stored (e.g., in the memory device 140) in relation to (e.g., creating a stored link with) the environment 108 and/or its associated location parameters.

In some embodiments, the controller device 110 may comprise an electronic and/or computerized controller device, such as a computer server and/or server cluster communicatively coupled to interface with the MR device 102 and/or the sensor device 106 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from the MR device 102 and/or the environment 108. The controller device 110 may also or alternatively comprise a plurality of electronic processing devices located at one or more various sites and/or locations (e.g., a distributed computing and/or processing network), such as the environment 108.

According to some embodiments, the controller device 110 (and/or the MR device 102) may store and/or execute specially-programmed instructions to operate in accordance with embodiments described herein. The controller device 110 may, for example, execute one or more programs that facilitate and/or cause the automatic detection, verification, data capture, and/or data analysis (e.g., fire investigation analysis and/or safety alerts) of the environment 108, as described herein. According to some embodiments, the controller device 110 may comprise a computerized processing device, such as a PC, laptop computer, computer server, and/or other network or electronic device, operated to manage and/or facilitate MR/AI-based fire investigation and/or safety analysis in accordance with embodiments described herein.

In some embodiments, the controller device 110 and/or the MR device 102 (and/or the sensor device 106) may be in communication with the memory device 140. The memory device 140 may store, for example, user/employee data, location data (such as coordinates, distances, etc.), security access protocol and/or verification data, polygon and/or template data, object classification data, scoring data, fire investigation and/or safety analysis and/or assessment data and/or logic (such as fire investigation and/or safety evaluation rules), and/or instructions that cause various devices (e.g., the controller device 110, the MR device 102, and/or the sensor device 106) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store data descriptive of the environment 108, device identifier data, user identifier data, AI logic and/or training data, image (and/or other sensor data) analysis data, image (and/or other sensor data) processing data, and/or various operating instructions, drivers, etc. In some embodiments, the memory device 140 may comprise a standalone and/or networked data storage device, such as a solid-state and/or non-volatile memory card (e.g., a Secure Digital (SD) card, such as an SD Standard-Capacity (SDSC), an SD High-Capacity (SDHC), and/or an SD extended-Capacity (SDXC), and any various practicable form-factors, such as original, mini, and micro sizes, such as those available from Western Digital Corporation of San Jose, CA). While the memory device 140 is depicted as a standalone component of the system 100 in FIG. 1, the memory device 140 may comprise multiple components. In some embodiments, a multi-component memory device 140 may be distributed across various devices and/or may comprise remotely dispersed components. Any or all of the MR device 102, the sensor device 106, and/or the controller device 110 may comprise the memory device 140 or a portion thereof, for example.

Figure 2:
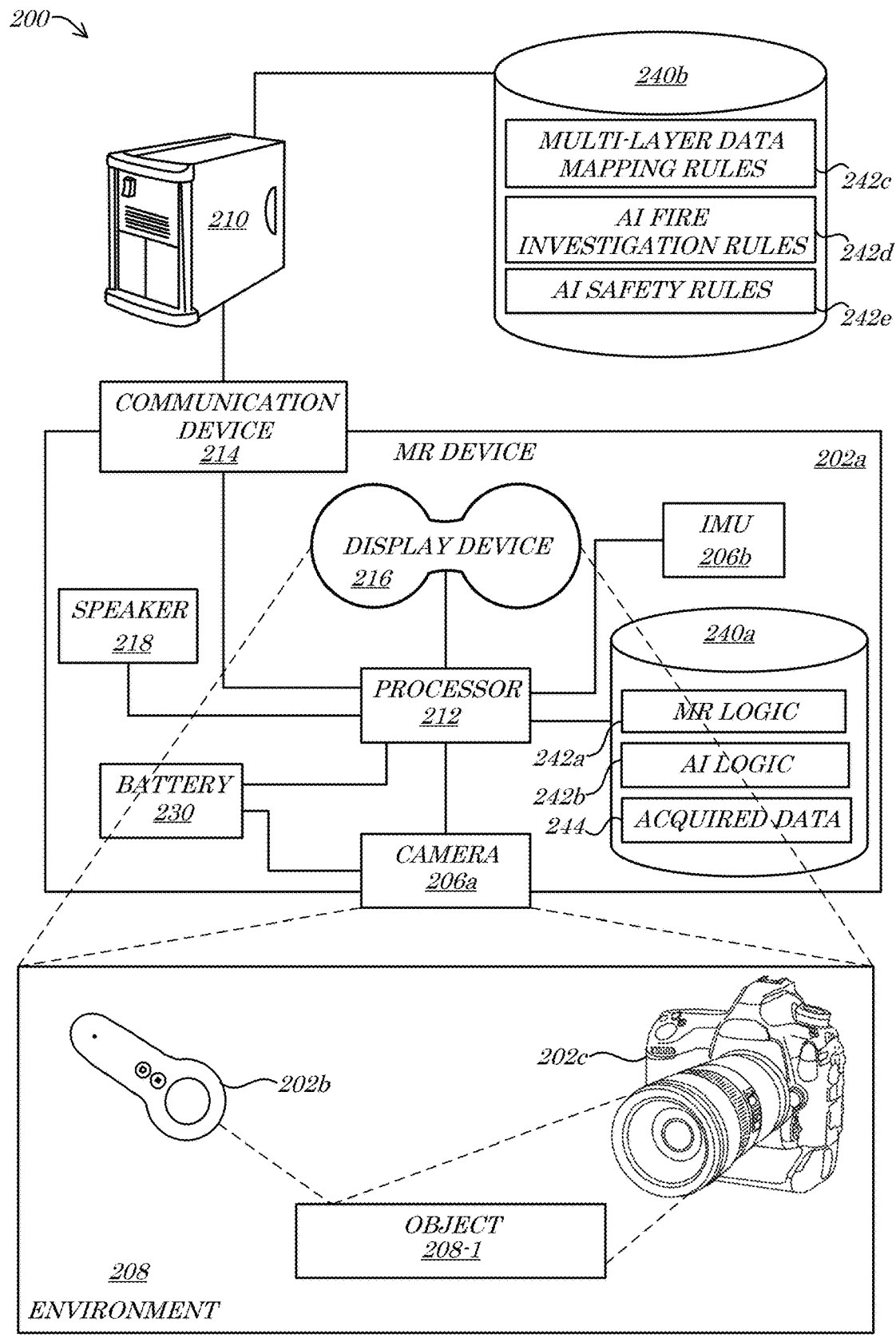
FIG. 2 is a diagram of a system according to some embodiments.

Turning to FIG. 2, a diagram of a system 200 according to some embodiments is shown. In some embodiments, the system 200 may comprise an MR/AI-based fire (and/or safety) investigation analysis system similar to the system of FIG. 1 herein. The system 200 may comprise, for example, one or more user devices 202a-c (such as an MR device 202a, a pointer device 202b, and/or a DSLR camera 202c). In some embodiments, the MR device 202a may comprise one or more sensors and/or input devices, such as a camera 206a and/or an IMU 206b. According to some embodiments, the camera 206a (and/or other type of sensor; e.g., a ToF sensor) may be coupled and/or disposed to capture data descriptive of an environment 208, e.g., comprising and/or defining one or more objects 208-1. In some embodiments, one or more of the user devices 202a-c, such as the MR device 202a, may be in communication with (e.g., via one or more wired and/or wireless networks) a server 210. According to some embodiments, the MR device 202a (e.g., a first user device 202a) may comprise a mobile and/or wearable electronic device, such as smart glasses, equipped with one or more built-in and/or coupled devices, such as the built-in camera 206a. In some embodiments, the camera 206a may be utilized (e.g., as directed and/or controlled by the MR device 202a) to acquire image data (and/or other sensor data, such as distance measurements) from the environment 208. In some embodiments the captured data may comprise a plurality of related and/or overlapping images, a stitched image, and/or other data elements, such as coordinate, distance, location, temperature, color, and/or other data arrays, matrices, lists, etc.

According to some embodiments, the pointer device 202b (e.g., a second user device 202b) may comprise an optical pointing device that is (i) in wireless communication with the MR device 202a and/or (ii) that is disposed within a FoV of the camera 206a. The pointer device 202b may, for example, be utilized to specify, highlight, identify, and/or select or indicate one or more points, lines, areas, and/or objects comprising and/or defining the object 208-1. In some embodiments, the DSLR camera 202c (e.g., a third user device 202c) may comprise a DSLR and/or high-resolution imaging device that is (i) in wireless communication with the MR device 202a and/or (ii) that is disposed within the FoV of the camera 206a. The DSLR camera 202c may, for example, be utilized to acquire or capture detailed (e.g., high-resolution) imagery of the one or more points, lines, areas, and/or objects comprising and/or defining the object 208-1.

In some embodiments, the server 210 may coordinate and/or broker communications between the user devices 202a-c. The pointer device 202b may, for example, be utilized to provide instructions, commands, prompts, and/or other data to the MR device 202a, such data being descriptive of desired information to be captured and/or acquired from the environment 208 and/or such information being indicative of the object 208-1 (e.g., from a plurality of objects; not separately shown). According to some embodiments, the MR device 202a comprises a wearable mobile electronic device (as depicted) disposed at or proximate to the environment 208 that is operated by a first user or "wearer" (not shown), such as a fire investigator conducting a site visit/inspection at and/or including the environment 208.

According to some embodiments, the MR device 202*a* may comprise a wearable electronic device, such as a pair of smart glasses, that comprises a processor 212, a communication device 214, a display device 216 (e.g., a see-through or MR-enabled display device), a speaker 218, and/or a battery 230 (e.g., that stores, generates, and/or provides power to any of the components 206*a*, 206*b*, 212, 214, 216, 218 of the MR device 202*a*. In some embodiments, the system 200 may comprise and/or have access to one or more data storage, memory, and/or database devices 240*a-b* storing and/or defining various instructions and/or programs 242*a-e*. The MR device 202*a* may, for example, comprise a first memory device 240*a* that stores and/or defines a first set of instructions 242*a-b*, such as a first or MR logic 242*a* and/or a second or AI logic 242*b*, and/or stores acquired data 244. In some embodiments, the server 210 may comprise and/or have access to a second memory device 240*b* that stores and/or defines a second set of instructions 242*c-e*, such as third or multilayer data mapping rules 242*c*, fourth or AI fire investigation rules 242*d*, and/or fifth or AI safety rules 242*e*. While certain programs/instructions 242*a-e* and/or data 244 are depicted as residing in and/or being executed upon a particular device 202*a*, 210, 240*a-b*, in some embodiments the various processing, such as AI-driven analysis, may be conducted on any single or combination of devices 202*a-c*, 210, 240*a-b* of the system 200. The MR device 202*a* may, for example, execute and/or store the multilayer data mapping rules 242*c* and/or the AI logic 242*b* may include and/or comprise the AI fire investigation rules 242*d* and/or the AI safety rules 242*e*.

According to some embodiments, data acquired by the camera 206*a* may be stored in the first memory device 240*a* (e.g., as the acquired data 244 and/or a portion thereof) and/or processed in accordance with the MR logic 242*a* and/or the AI logic 242*b*. The MR device 202*a* may be utilized to automatically capture (e.g., utilizing the camera 206*a*) data descriptive of the environment 208 (and/or of the object 208-1), for example, that is automatically processed by the MR device 202*a* to (i) embed and/or layer information with respect to different locations (e.g., the object 208-1) within the environment and/or (ii) identify and/or remediate a safety issue in the environment 108. The MR device 202*a* may, in some embodiments, execute and/or apply the AI logic 242*b* to identify, apply, resolve, and/or process one or more rules and/or rule sets coded to categorize and/or identify embedded data layers and/or safety issues and/or events. The MR device 202*a* (and/or the processor 212 thereof) may execute the AI logic 242*b*, for example, by applying a trained AI model to the acquired data 244. In some embodiments, the AI logic 242*b* may categorize and/or identify various objects 208-1 to identify embedded data layers and/or associated media and/or to identify a potential safety issue, such as an unsafe condition in the environment 208.

According to some embodiments, the MR logic 242*a* may be executed (e.g., by the MR device 202*a* and/or the processor 212 thereof) to dynamically integrate output descriptive of the processing results of the AI logic 242*b*, via the display device 216. In the case that the display device 216 comprises a see-through and/or MR-enabled display, for example, embedded data (e.g., a subset of the acquired data 244) assigned to the object 208-1 and/or safety information associated with the object 208-1 may be output via the display device 216 in a manner so that it appears (e.g., to the wearer) to be superimposed or positioned in the FoV of the display device 216 in the real-world environment 208 (e.g., MR or MR projection). In some embodiments, the display device 216 may comprise one or more eye-tracking cameras (not separately shown; e.g., the camera 206*a* and/or one or more additional or alternative cameras not shown) that provide data to the processor 212 so that the MR logic 242*a* may actively move or reorient output to match the location in the environment 208 based on the eye movements/gaze of the wearer of the MR device 202*a*.

In some embodiments, the IMU 206*b* may track and/or monitor movements of the MR device 202*a* such that the current position and FOV with respect to the environment 208 may be accurately determined and updated. In such a manner, for example, new data captured by the camera 206*a* may be utilized to append to an existing model (or partial model), such as a point cloud descriptive of the environment 208, and/or existing data may be appropriately output via the display device 216 to correspond with portions or locations of the environment that are being viewed by the wearer. According to some embodiments, the speaker 218 may be utilized to output audio data to the wearer (or others), such as audible alerts regarding identified safety issues in the environment 208.

In some embodiments, the communication device 214 may be communicatively coupled with (e.g., in communication with) one or more of the pointer device 202*b*, the DSLR camera 202*c*, and/or the server 210. The MR device 202*a* may receive data from either or both of the pointer device 202*b* and the DSLR camera 202*c*, for example, that is indicative and/or descriptive of the object 208-1 (and/or the environment 208). The pointer device 202*b* may provide (and the communication device 214 may receive), for example, coordinate, pose, and/or positioning data that identifies the object 208-1 and/or a location (e.g., point, line, area, coordinates) thereof. In some embodiments, the DSLR camera 202*c* may provide (and the communication device 214 may receive) high-resolution imagery (photo and/or video) data descriptive of the object 208-1 and/or coordinate, pose, and/or positioning data (e.g., of the object 208-1 and/or of the DSLR camera 202*c*) that identifies or indicates the object 208-1 and/or a location (e.g., point, line, area, coordinates) thereof. According to some embodiments, the MR device 202*a* may integrate data received from either or both of the pointer device 202*b* and the DSLR camera 202*c* with (and/or to define) the acquired data 244 and/or utilize such data to perform AI-driven data embedding, fire investigation, and/or safety analysis.

According to some embodiments, data captured and/or acquired (e.g., the acquired data 244) by the camera 206*a*, the IMU 206*b*, the pointer device 202*b*, and/or the DSLR camera 202*c* may be transmitted from the MR device 202*a* to the server 210. Once acquired, for example, the data may be transmitted from the MR device 202*a* to the server 210 (e.g., via a wireless network; not shown). According to some embodiments, the server 210 may conduct an AI-based fire investigation, embedded data, and/or safety assessment of the environment 208, e.g., based on the acquired data 244 (or a portion thereof received from the MR device 202*a*). The server 210 may, for example, access the second data storage device 240*b* storing the second set of instructions 242*c-e*.

In some embodiments, the server 210 may execute one or more of the instructions 242*c-e* to analyze and/or assess the data provided by the MR device 202*a*. The server 210 may, for example, execute the multilayer data mapping rules 242*c* to embed secondary data elements with primary data elements by tagging and/or assigning a high-resolution image to a particular coordinate and/or location (e.g., the object 208-1) within the environment 208. According to some embodiments, the multilayer data mapping rules 242*c* may automatically identify spatial relationships of different identified locations and compare the relationships, coordinates, and/or locations to establish data element and/or layer dependencies, keys, and/or links (e.g., between different data types). The multilayer data mapping rules 242*c* may, for example, automatically map high-resolution imagery captured by the DSLR camera 202*c* to the object 208-1, e.g., that is identified and/or defined by the pointer device 202*b* and/or by the MR device 202*a*.

According to some embodiments, the server 210 may execute the AI fire investigation rules 242*d*. The AI fire investigation rules 242*d* may, for example, define instructions that are operable to identify and/or locate various objects (such as the object 208-1) in the environment 208, identify a position of the camera 206*a*, the MR device 202*a*, the pointer device 202*b*, and/or the DSLR camera 202*c* (e.g., at a current time and/or at a time when the acquired data 244 is captured, defined, etc.), identify walls, ceilings, floors, and/or furnishings or attributes of the environment 208 (e.g., the object 208-1), define an array of coordinates and/or points descriptive of the environment 208 (e.g., a 3-D point cloud), and/or conduct an automated fire investigation and/or safety assessment of the environment 208. In some embodiments, the AI fire investigation rules 242*d* may comprise instructions developed automatically by operation of an AI process that is seeded with a training data set (not shown). The AI fire investigation rules 242*d* may be trained, for example, utilizing a plurality of previous fire investigation assessment results and/or data, such that the AI fire investigation rules 242*d* may reverse engineer and/or derive a set of rules, thresholds, and/or decision trees for detection and/or identification of image artifacts and/or characteristics defined by various data patterns therein. According to some embodiments, the AI fire investigation rules 242*d* may be utilized to identify objects (e.g., the object 208-1) that are relevant to fire investigation assessments (e.g., combustion sources, burn patterns, material types, residue types/characteristics, chemical signatures, etc.).

In some embodiments, the server 210 may execute the AI safety rules 242*e*. The AI safety rules 242*e* may, for example, compare and/or process image and/or data patterns representative of the object 208-1 (e.g., stored as the acquired data 244, or a portion thereof) to identify safety issues. Relational (and/or absolute) location metrics derived from the acquired data 244 may, for example, be utilized to generate, define, and/or process a 3-D point cloud and/or model of the environment 208 (and/or the object 208-1 thereof) that is then utilized to derive relational and/or absolute location information for various objects 208-1. In some embodiments, location, position, and/or orientation metrics descriptive of various identified objects 208-1 may be utilized as inputs, for example, that are processed in accordance with AI safety rules 242*e* comprising thresholds, ranges, and/or criteria. Identified data values, patterns, imagery objects, and/or other data may be compared to one or more stored thresholds, formulas, tables, and/or models, for example, to determine that the identified data is above or below a threshold and/or within or outside of a given value/data range. The AI safety rules 242*e* may, for example, compare a measurement or reading descriptive of the object 208-1 to one or more stored and related thresholds, ranges, etc., to determine that the measurement/reading is out of bounds and, accordingly, warrants an outputting of a safety message/warning/alert. In some embodiments, the AI safety rules 242*e* may comprise instructions developed automatically by operation of an AI process that is seeded with a training data set (not shown). The AI safety rules 242*e* may be trained, for example, utilizing a plurality of previous safety assessment results and/or data, such that the AI safety rules 242*e* may reverse engineer and/or derive a set of rules, thresholds, and/or decision trees for safety analysis. The AI safety rules 242*e* may, in some embodiments, compare and/or compute location data derived from acquired data 244 to measure and/or calculate relational data metrics for one or more identified and/or classified objects (e.g., the object 208-1) in, at, or proximate to the environment 208. Such mathematical logic, formulas, and/or models may be utilized, for example, to measure distances between objects 208-1 and/or across or between various portions of the environment 208 (e.g., via a three-dimensional model of the environment 208). In some embodiments, the AI safety rules 242*e* may process input data from the MR device 202*a* to produce safety assessment and/or analysis output as a quantitative result, such as a score and/or ranking, and/or a qualitative result (such as "good", or "unhealthy", or "warning!"), alert, alarm, etc.

Fewer or more components 202*a-c*, 206*a-b*, 208, 210, 212, 214, 216, 218, 230, 240*a-b*, 242*a-e*, 244 and/or various configurations of the depicted components 202*a-c*, 206*a-b*, 208, 210, 212, 214, 216, 218, 230, 240*a-b*, 242*a-e*, 244 may be included in the system 200 without deviating from the scope of embodiments described herein. In some embodiments, the components 202*a-c*, 206*a-b*, 208, 210, 212, 214, 216, 218, 230, 240*a-b*, 242*a-e*, 244 may be similar in configuration and/or functionality to similarly named and/or numbered components as described herein. In some embodiments, the system 200 (and/or portions thereof) may comprise an MR/AI-based fire (and/or safety) investigation analysis program, system, and/or platform programmed and/or otherwise configured to execute, conduct, and/or facilitate the method 600 of FIG. 6 herein, and/or portions thereof.

Figure 3A:
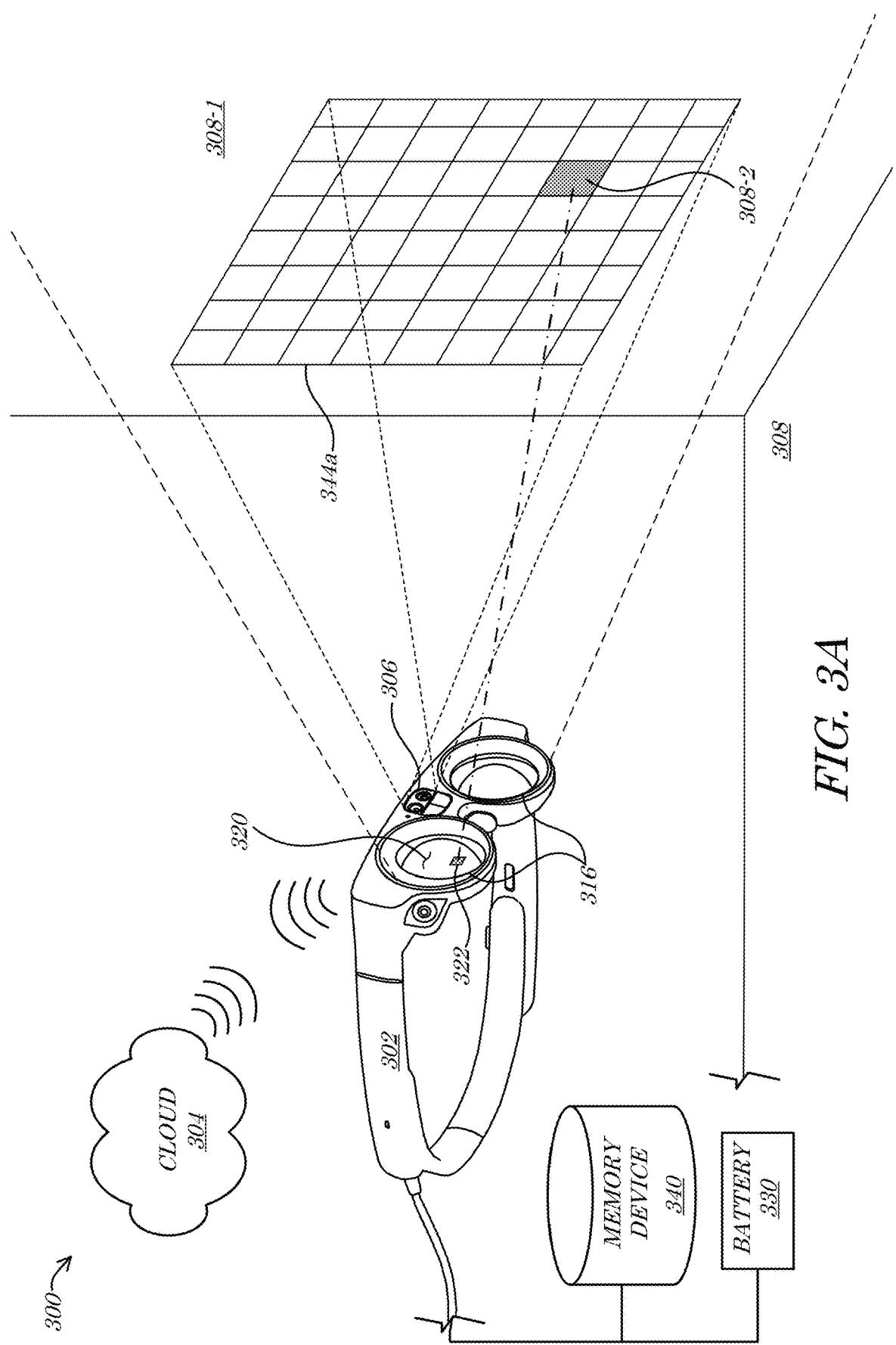
FIG. 3A, FIG. 3B, and FIG. 3C are perspective diagrams of a system according to some embodiments.
Figure 3B:
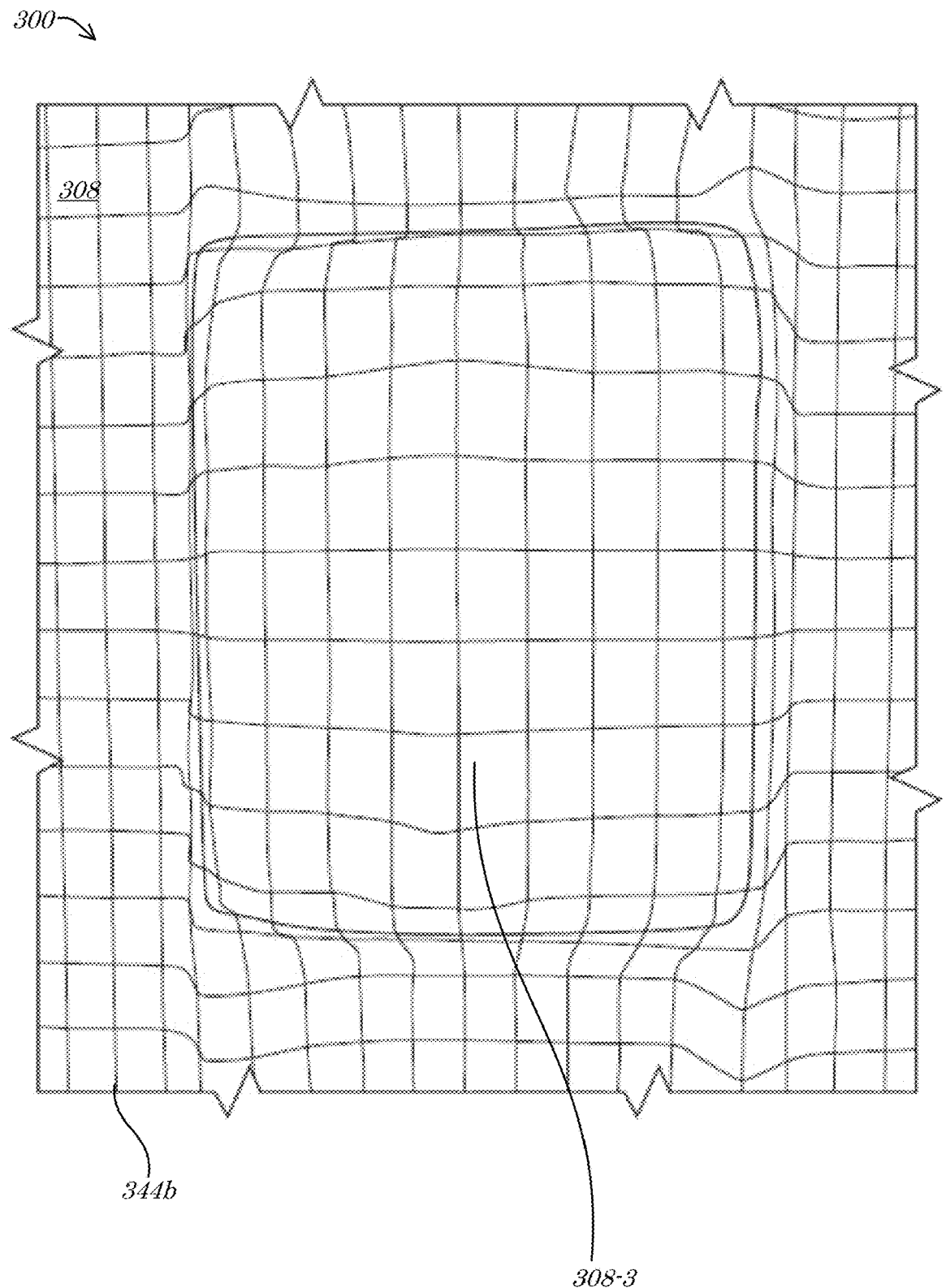
Figure 3C:
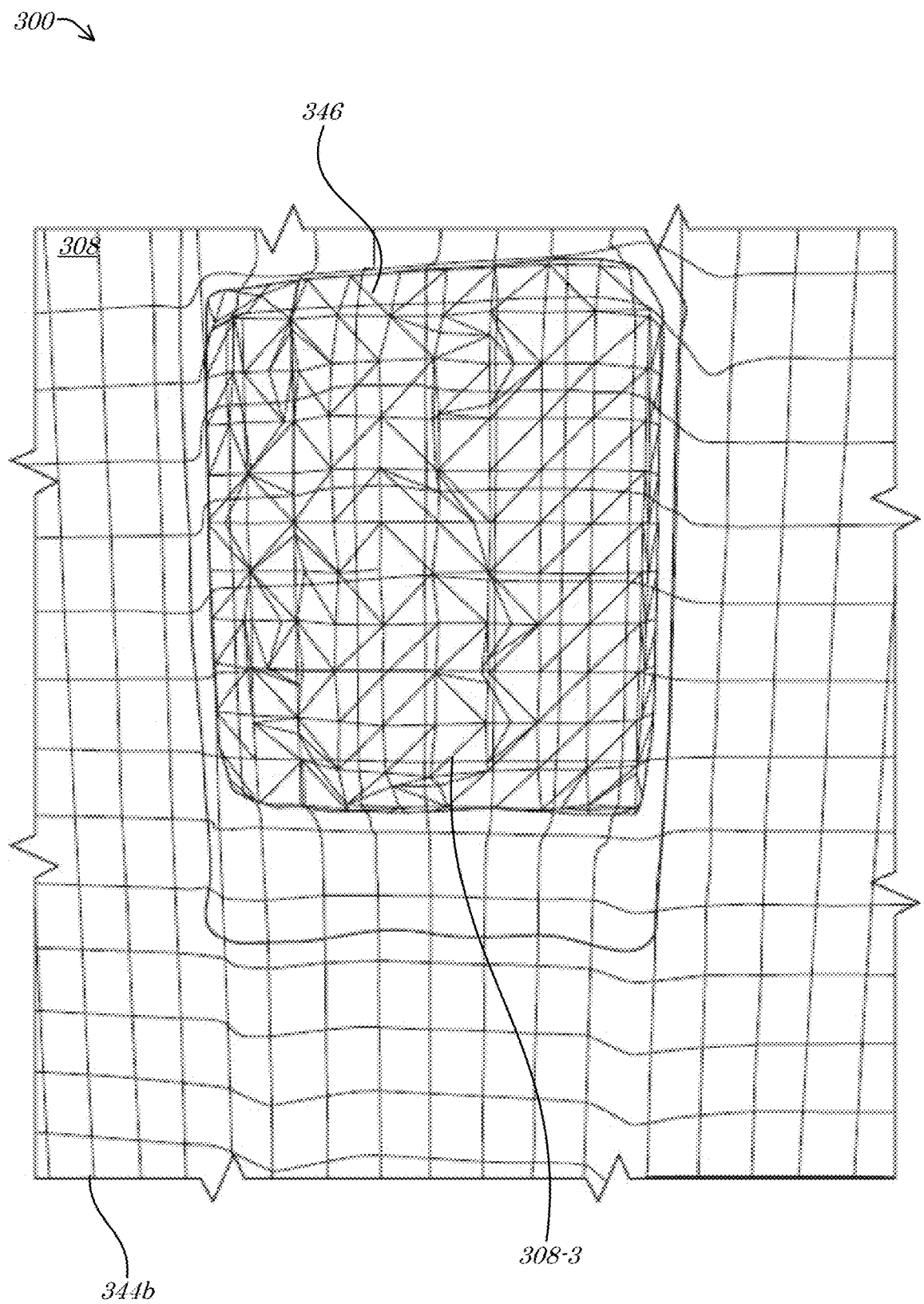

Referring now to FIG. 3A, FIG. 3B, and FIG. 3C, perspective diagrams of a system according to some embodiments are shown. In some embodiments, and with initial reference to FIG. 3A, the system 300 may comprise a wearable MR device 302 that may be in wireless communication with a cloud 304 (e.g., wireless and/or remote network), may comprise a sensor 306, such as one or more cameras (e.g., at least one low-resolution camera, in some embodiments) and/or a ToF sensor, and that may be disposed (as depicted) in an environment 308, such as a room in a building. In some embodiments, the environment 308 may comprise and/or the MR device 302 may detect and/or identify (e.g., utilizing the sensor 306) a first object 308-1 in the environment 308, such as the wall as depicted. According to some embodiments, the sensor 306 and/or the MR device 302 (e.g., by processing data captured by the sensor 306) may identify and/or define a specific point, line, and/or area 308-2 in the environment 308 and/or of the first object 308-1. As depicted, for example, the specific area 308-2 comprises a portion/area of the first object 308-1 (e.g., a portion of the wall). As depicted for purposes of non-limiting example in FIG. 3B and FIG. 3C, the environment 308 may comprise a second object 308-3. In some embodiments, any or all objects/areas 308-1, 308-2, 308-3 may comprise one or more features and/or characteristics that are identified by an image processing application, such as an AI-enabled object recognition program, executed by the MR device 302.

In some embodiments, the MR device 302 may comprise one or more display devices 316, such as the dual-lens, wearable, see-through, "glasses"-style display device 316 depicted in FIG. 3A. The physical arrangement, coupling, and/or cooperative orientation of the display device(s) 316 and the sensor 306 may facilitate the coordinate capturing and outputting of data in accordance with MR display techniques. As depicted, for example, the specific area 308-2 of the wall in the environment 308 may be identified and/or information descriptive thereof may be captured as the specific area 308-2 in the FoV of the sensor 306. The MR device 302 may utilize the captured data along with data coordinating the FoV of the see-through display device 316 with the FoV of the sensor 306 to output, display, and/or project, via an interface 320, an indication or graphical representation 322 of the specific area 308-2. The graphical representation 322 may be selectively output on a particular portion of the interface 320 such that when the wearer looks through the display device 316 and the interface 320, the graphical representation 322 coincides with (and appears to be located at) the location of the specific area 308-2. According to some embodiments, the MR device 302 may comprise one or more eye-tracking cameras (not separately shown) so that the graphical representation 322 can be dynamically repositioned on the interface 320 to match the current gaze (e.g., eye direction) of the wearer, such that the correspondence of the graphical representation 322 and the specific area 308-2 is maintained even as the wearer looks around the environment 308 (e.g., irrespective of whether the MR device 302 itself is repositioned). In such a manner, for example, the MR device 302 may provide MR functionality in the environment 308.

According to some embodiments, the MR device 302 may comprise and/or be in communication with a battery 330 (e.g., that stores and/or provides power to the MR device 302) and/or a memory device 340. The memory device 340 may, for example, store data acquired by the sensor 306 and/or that is otherwise descriptive of the environment 308 and/or one or more of the objects/areas 308-1, 308-2, 308-3. In some embodiments, the MR device 302 may generate and/or define a coordinate grid 344a-b and/or other representation of a point cloud, locations, etc., descriptive of the environment 308 (and/or the objects/areas 308-1, 308-2, 308-3 thereof). In some embodiments, for example, the data descriptive of the environment 308 may be parsed into and/or assigned a coordinate reference system. According to some embodiments, a rectilinear coordinate system identifying various points throughout the environment 308 may be identified, computed, and/or assigned. In some embodiments, an array of coordinates assigned to the data may correspond to (and/or be mapped to) each point, pixel, or instance of data that is descriptive of the environment 308. In such a manner, for example, each pixel and/or data point may be uniquely identified and/or referenced with respect to other pixels and/or data points (e.g., presuming that the size of the pixels and/or data points is known, calculated, and/or otherwise derived). As depicted in FIG. 3A, for example, a first coordinate grid 344a may comprise and/or represent a matrix, grid, and/or other distribution of locations of a plurality of points, lines, and/or areas of the first object 308-1—e.g., a grid of rectilinear coordinates representative and/or descriptive of the geometry and/or location of the wall. As depicted in FIG. 3B and FIG. 3C, a second coordinate grid 344b may comprise and/or represent a matrix, grid, and/or other distribution of locations of a plurality of points, lines, and/or areas of the second object 308-3. According to some embodiments, the coordinate grids 344a-b may be utilized to compute, calculate, generate, and/or define a surface model 346 (e.g., a wire-mesh model) of the environment 308 (and/or the objects/areas 308-1, 308-2, 308-3 thereof). As depicted in FIG. 3B and FIG. 3C, for example, the second coordinate grid 344b that is descriptive of points on or about (e.g., proximate to) the second object 308-3 may be utilized to generate the surface model 346 that represents the 3-D shape, size, and position of the second object 308-3.

In some embodiments, the sensor 306 may acquire and/or the surface model 346 may be generated utilizing one or more types of data, such as imagery, LiDAR (e.g., distance readings and/or measurements), temperatures, etc. According to some embodiments, the data may also or alternatively comprise any type or quantity of underlying data, such as coordinates, location data, size data, perimeter data, movement data, etc. In some embodiments, any or all of the objects/areas 308-1, 308-2, 308-3, the coordinate grids 344a-b, and/or the surface model 346 may be utilized by processes described herein to effectuate AI-based fire and/or safety investigation analysis and/or assessments. An AI image analysis and/or fire and/or safety analysis program may, for example, process acquired data (e.g., from the sensor 306) and identify and classify the plurality of objects/areas 308-1, 308-2, 308-3, e.g., based on application of AI object identification (e.g., pattern recognition) and/or classification logic. The AI program(s) may be coded, in some embodiments, to evaluate lines and/or patterns within the data to identify and/or classify any or all of the plurality of objects/areas 308-1, 308-2, 308-3. According to some embodiments, lines, patterns, and/or pixels in the data may be analyzed (e.g., by the AI program) to identify one or more of the objects/areas 308-1, 308-2, 308-3. The data may be systematically analyzed, for example, to identify patterns that match patterns and/or characteristics stored in the memory device 340 (and/or available via the cloud 304). The AI program may analyze the data and identify a match between stored feature data, for example. According to some embodiments, the matching of the geometries, image artifacts (e.g., lines, colors, pixels, hue, saturation, etc.), and/or other data may permit a cross-reference to a categorization of the objects/areas 308-1, 308-2, 308-3. Stored data may relate the second object 308-3 to a stored indication of an electrical breaker box or panel, for example, and/or to a specific type of electrical breaker box, such as a Siemens® PN3048L1125C PN Series circuit breaker panel available from Siemens AG of Munich, Germany.

According to some embodiments, relative (and/or absolute) spatial relationships between the identified/classified objects/areas 308-1, 308-2, 308-3 may be identified, measured, and/or calculated. In some embodiments, various measurements, calculations, and/or determinations may be derived from the data descriptive of the environment 308. According to some embodiments, the coordinate grids 344a-b and/or the surface model 346 may be utilized to evaluate the various objects/areas 308-1, 308-2, 308-3. The coordinate grids 344a-b and/or the surface model 346 may be utilized, along with referential distance estimations based on identified objects/areas 308-1, 308-2, 308-3, for example, to estimate sizes, orientations, settings, and/or positions of the various objects/areas 308-1, 308-2, 308-3. In some embodiments, measured and/or calculated values descriptive of distances, relationships, etc., may be utilized to conduct and/or facilitate AI and/or MR-based fire and/or safety assessments, as described herein. According to some embodiments, the measured and/or calculated values may be utilized to structure and/or define multilayer data relationships and/or embedding, as described herein.

Fewer or more components 302, 304, 306, 308-1, 308-2, 308-3, 316, 320, 322, 330, 340, 344a-b, 346 and/or various configurations of the depicted components 302, 304, 306, 308-1, 308-2, 308-3, 316, 320, 322, 330, 340, 344a-b, 346 may be included in the system 300 without deviating from the scope of embodiments described herein. In some embodiments, the components 302, 304, 306, 308-1, 308-2, 308-3, 316, 320, 322, 330, 340, 344a-b, 346 may be similar in configuration and/or functionality to similarly named and/or numbered components as described herein. In some embodiments, the system 300 (and/or portions thereof) may comprise an MR/AI-based fire (and/or safety) investigation analysis program, system, and/or platform programmed and/or otherwise configured to execute, conduct, and/or facilitate the method 600 of FIG. 6 herein, and/or portions thereof.

Referring now to FIG. 4A, FIG. 4B, FIG. 4C, FIG. 4D, and FIG. 4E, diagrams of an example spatial modeling system 400 according to some embodiments are shown. In some embodiments, the system 400 may comprise an MR device 402 worn by a wearer/user "A" within a room 408 (e.g., an environment). According to some embodiments, the room 408 may comprise various objects, such as a lawnmower 408-1 (a first object), a doorway 408-2 (a second object), and/or a beam 408-3 (a third object). In some embodiments, the MR device 402 may output, e.g., to the wearer/user "A" and via a see-through display device (not separately labeled), different instances of an interface 420a-d (each of which is depicted, consecutively, in FIG. 4B, FIG. 4C, FIG. 4D, and FIG. 4E). According to some embodiments, the interfaces 420a-d may comprise and/or define various output elements, such as, but not limited to, a virtual pointer indicator 422, a virtual action icon 424a-c, and/or a virtual information placeholder 426a-c. In some embodiments, the interfaces 420a-d may be generated based on and/or to output indications of various data 444a-c.

Figure 4A:
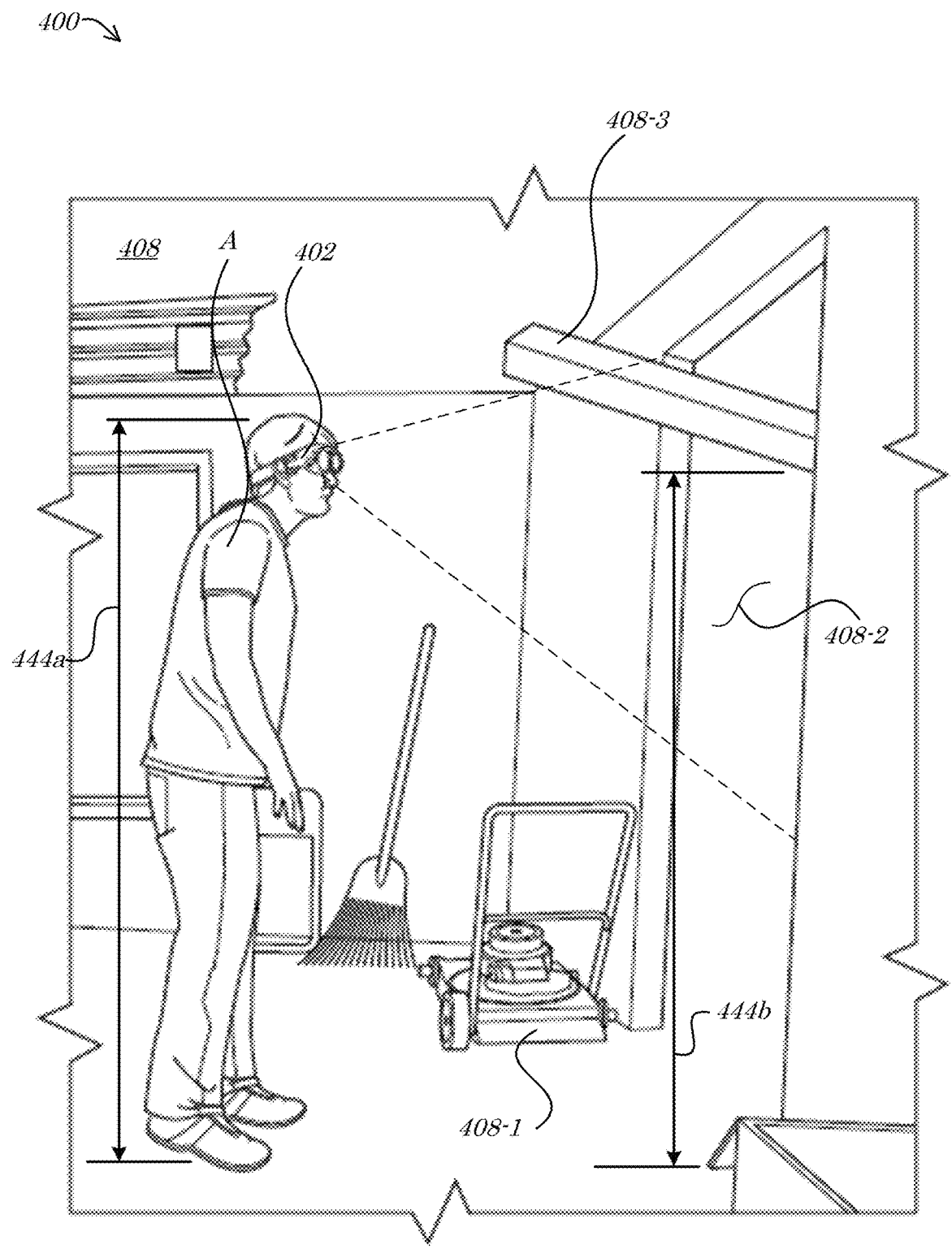
FIG. 4A, FIG. 4B, FIG. 4C, FIG. 4D, and FIG. 4E are diagrams of an example spatial modeling system according to some embodiments.

In some embodiments, as described herein, the MR device may acquire sensor data within a FoV of the MR device 402, as depicted by the dotted lines in FIG. 4A. In practice, the wearer/user "A" may reorient and/or reposition the MR device 402 within the room to capture a continuous and/or comprehensive data set descriptive of the room 408, which may be utilized to generate and/or define a 3-D point cloud and/or a 3-D wire-mesh model of the room 408. In some embodiments, the 3-D wire-mesh model, 3-D point cloud, and/or sensor data may be utilized to identify safety hazards within the environment 408. In the case of the example room 408 depicted in FIG. 4A, for example, the MR device 402 may identify and classify the first object 408-1 as a "lawnmower", may determine based on sensor data (from the MR device 402 and/or from a secondary sensor, not shown) that the lawnmower 408-1 is above a temperature threshold, and that the over-threshold temperature reading constitutes a safety hazard (e.g., it may burn the wearer/user "A" if touched, may contain a non-extinguished fire, and/or may be capable of igniting or exploding due to gasoline that such objects likely retain).

According to some embodiments, a safety hazard or condition may be determined to exist based on a comparison of measurements and/or spatial data descriptive of the room 408. In the case that the MR device 402 acquires information indicating that a carbon dioxide level in the room 408 is measured to be forty thousand parts per million (40,000 ppm), for example, the MR device 402 may compare the reading to a stored acceptable threshold or range and determine that the measured value, being above the acceptable range/threshold, constitutes a safety hazard. In some embodiments, the MR device 402, utilizing the 3-D wire-mesh model, 3-D point cloud, and/or sensor data, may determine one or more measurements of the environment 408. In the example depicted in FIG. 4A, the MR device 402 may measure (and/or have access to and/or receive) a first height 444a (first data) of the wearer/user "A" and may compute (and/or receive) a second height 444b (second data) of the doorway 408-2. In the case that the second height 444b of the doorway 408-2 is less than the first height 444a of the wearer/user "A", as depicted for purposes of example in FIG. 4A and due to the low-hanging beam 408-3, a safety hazard may be identified, e.g., because the wearer/user "A" may be likely to hit their head on the beam 408-3. Such distance, height, proximity, and/or measurement-based safety hazard identification may be particularly useful in facilitating a reduction in injuries in the case that the environment 408 comprises low light, smoky, and/or charred conditions.

Figure 4B:
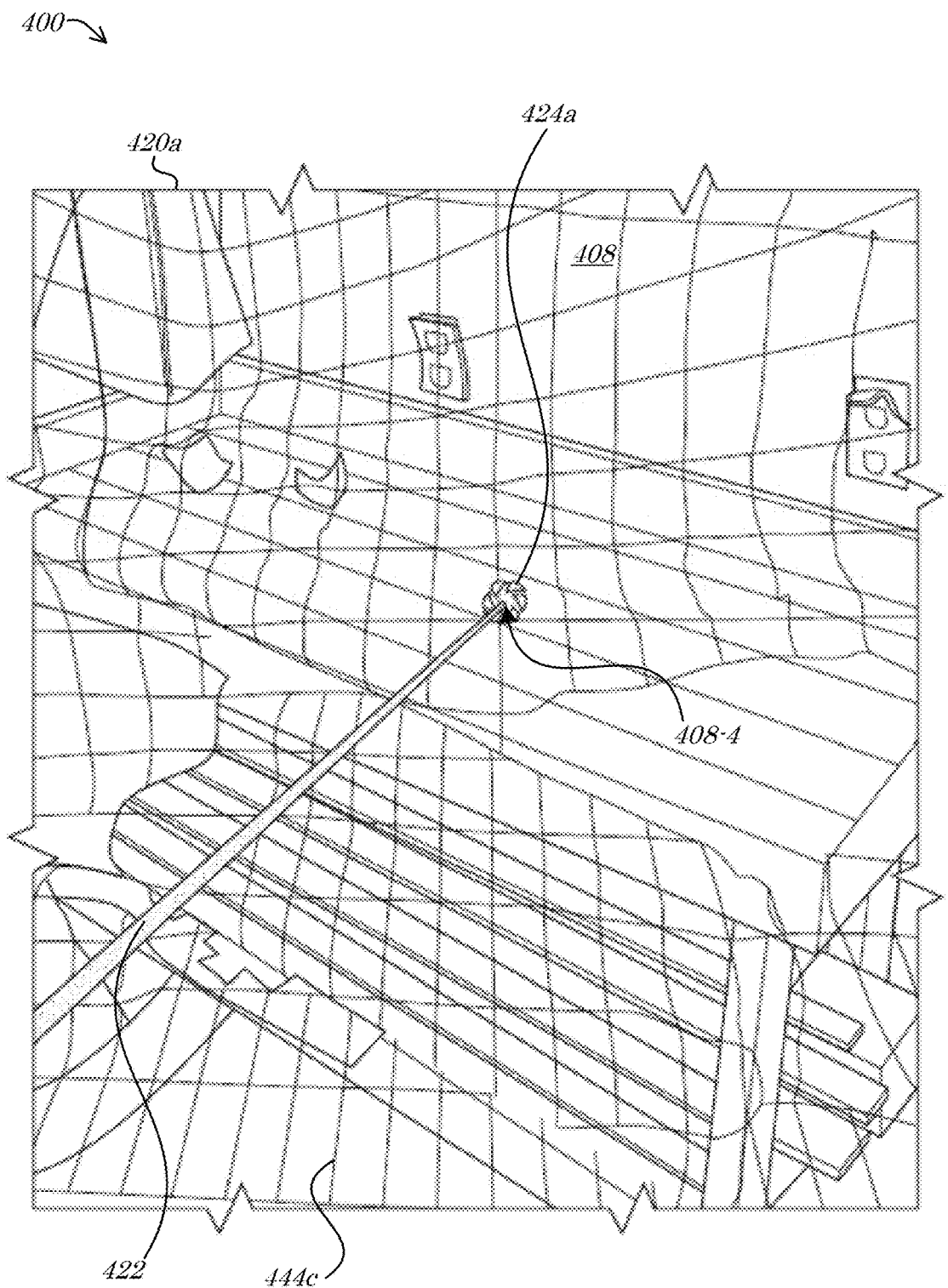

In some embodiments, and with reference to FIG. 4B, the MR device 402 may output a first instance of the interface 420a that depicts a first area of the environment 408. According to some embodiments, the first instance of the interface 420a may comprise the virtual pointer indicator 422 that emanates from a source associated with the wearer/user "A" (e.g., a hand-held pointer device and/or body part of the wearer/user "A", not shown in FIG. 4B, FIG. 4C, FIG. 4D, or FIG. 4E) and terminates at a first particular point, line, area, and/or other object 408-4 in the environment 408. The first particular object 408-4 may comprise, for example, a point (or group of points; e.g., an area) of a 3-D point cloud as represented by a coordinate grid 444c (which may or may not be displayed to the wearer/user "A", but is depicted at least for ease of illustration). According to some embodiments, the virtual pointer indicator 422 may terminate at the first particular object 408-4 and may comprise and/or be coupled to a first virtual action icon 424a. The first virtual action icon 424a may, for example, comprise a size and/or shape that is indicative of a first action, command, selection, and/or other input capable of being defined by the wearer/user "A" and utilized by the MR device 402. In some embodiments, the wearer/user "A" may alter and/or adjust a position and/or orientation of the MR device 402, the separate pointing device/object, and/or of the wearer/user "A" themselves, to reposition the virtual pointer indicator 422 and the first virtual action icon 424a within the environment.

Figure 4C:
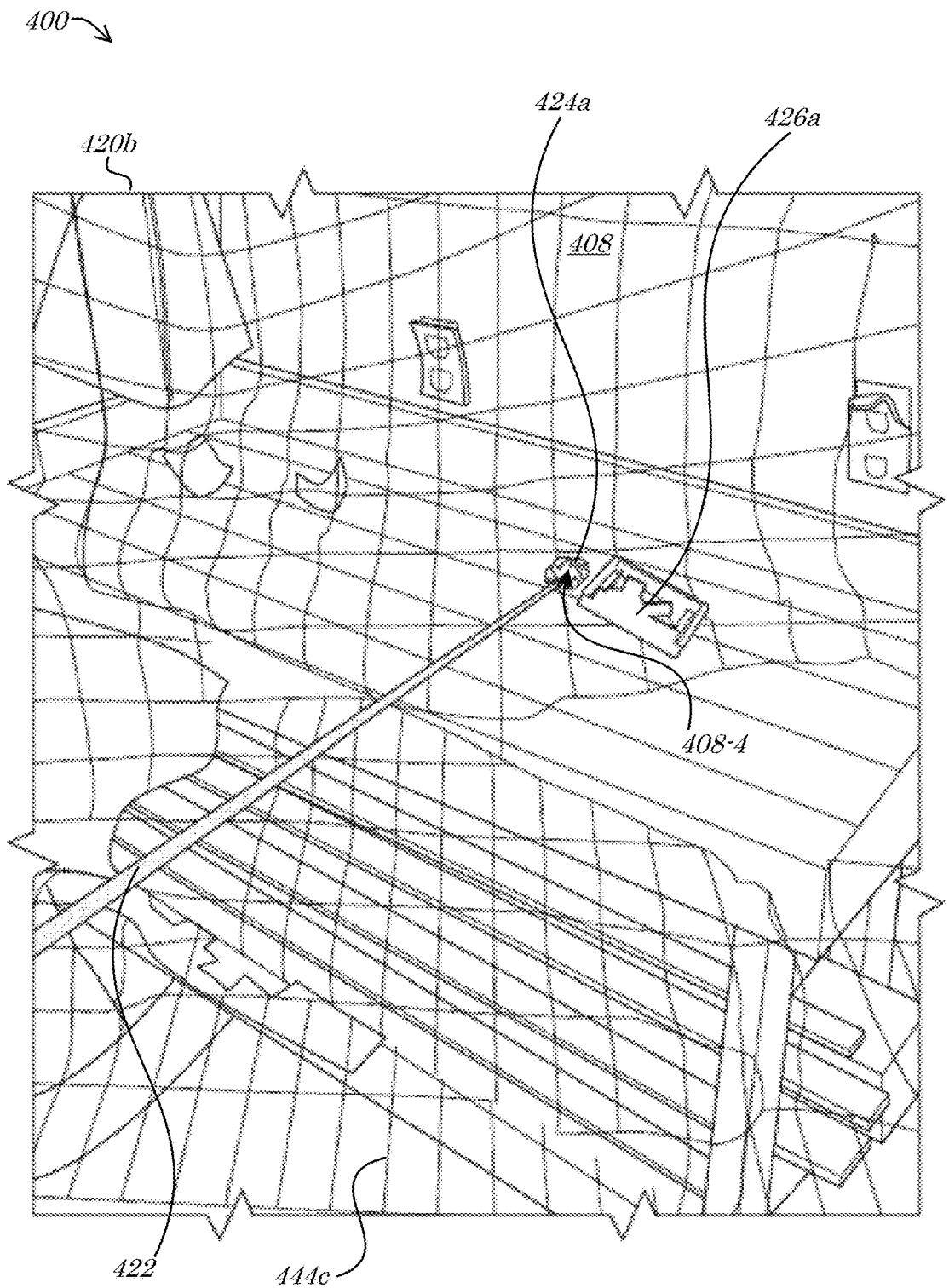

According to some embodiments, the wearer/user "A" may activate an input mechanism (not separately shown; e.g., a button, switch, etc.) to initiate and/or execute the first action/command associated with the first virtual action icon 424a. In some embodiments, activation of the first virtual action icon 424a (and/or an indication of input associated therewith) may cause the first instance of the interface 420a of FIG. 4B to change and/or progress to a second instance of the interface 420b as depicted in FIG. 4C. Activation of the first virtual action icon 424a may, for example, cause a first virtual information placeholder 426a to be output. The first virtual information placeholder 426a may, in some embodiments, be assigned and/or associated with a particular type of data, such as a particular tag, metadata, etc. In some embodiments, the first virtual information placeholder 426a may comprise a placeholder that is assigned to a text comment or note (e.g., defined by the wearer/user "A"). In such a manner, for example, a textual note/comment may be embedded with and/or assigned to the first particular object 408-4.

Figure 4D:
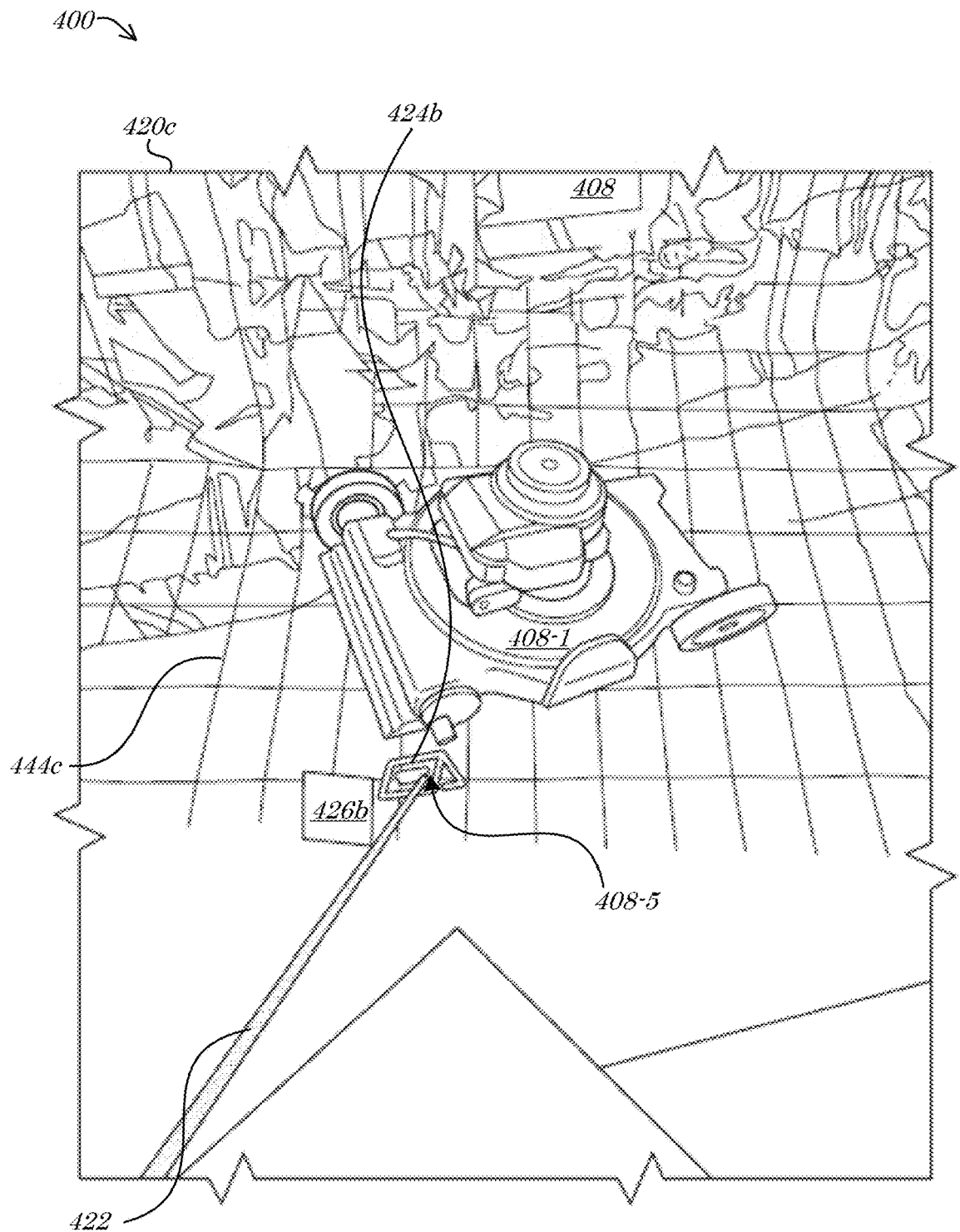

In some embodiments, and with reference to FIG. 4D, the MR device 402 may output a third instance of the interface 420c that depicts a second area of the environment 408. According to some embodiments, the third instance of the interface 420c may comprise the virtual pointer indicator 422 that emanates from the source associated with the wearer/user "A" and terminates at a second particular point, line, area, and/or other object 408-5 in the environment 408. The second particular object 408-5 may comprise, for example, a point (or group of points; e.g., an area) of a 3-D point cloud, e.g., as represented by the coordinate grid 444c. According to some embodiments, the virtual pointer indicator 422 may terminate at the second particular object 408-5 and may comprise and/or be coupled to a second virtual action icon 424b. The second virtual action icon 424b may, for example, comprise a size and/or shape that is indicative of a second action, command, selection, and/or other input capable of being defined by the wearer/user "A" and utilized by the MR device 402. In some embodiments, the wearer/user "A" may alter and/or adjust a position and/or orientation of the MR device 402, the separate pointing device/object, and/or of the wearer/user "A" themselves, to reposition the virtual pointer indicator 422 and the second virtual action icon 424b within the environment.

According to some embodiments, the wearer/user "A" may activate the input mechanism to initiate and/or execute the second action/command associated with the second virtual action icon 424b. In some embodiments, activation of the second virtual action icon 424b (and/or an indication of input associated therewith) may cause the third instance of the interface 420c to generate and/or output a second virtual information placeholder 426b. The second virtual information placeholder 426b may, in some embodiments, be assigned and/or associated with a particular type of data, such as a particular tag, metadata, etc. In some embodiments, the second virtual information placeholder 426b may comprise a placeholder that is assigned to an evidence marker. In such a manner, for example, an indication of an item of evidence (e.g., with respect to a fire investigation) may be embedded with and/or assigned to the second particular object 408-5.

Figure 4E:
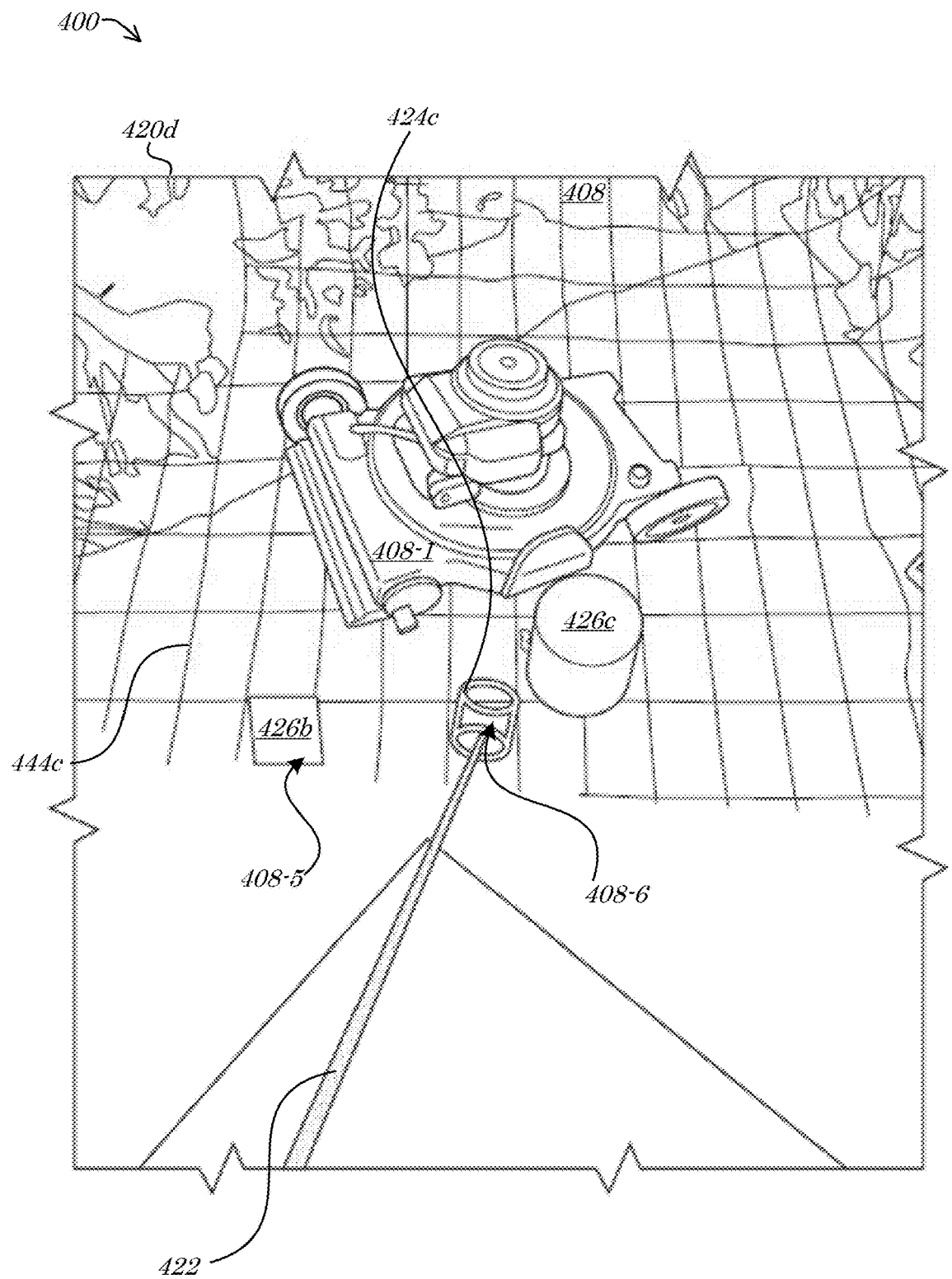

In some embodiments, and with reference to FIG. 4E, the MR device 402 may output a fourth instance of the interface 420d that depicts the second area of the environment 408. According to some embodiments, the fourth instance of the interface 420d may comprise the virtual pointer indicator 422 that emanates from the source associated with the wearer/user "A" and terminates at a third particular point, line, area, and/or other object 408-6 in the environment 408. The third particular object 408-6 may comprise, for example, a point (or group of points; e.g., an area) of a 3-D point cloud, e.g., as represented by the coordinate grid 444c. According to some embodiments, the virtual pointer indicator 422 may terminate at the third particular object 408-6 and may comprise and/or be coupled to a third virtual action icon 424c. The third virtual action icon 424c may, for example, comprise a size and/or shape that is indicative of a third action, command, selection, and/or other input capable of being defined by the wearer/user "A" and utilized by the MR device 402. In some embodiments, the wearer/user "A" may alter and/or adjust a position and/or orientation of the MR device 402, the separate pointing device/object, and/or of the wearer/user "A" themselves, to reposition the virtual pointer indicator 422 and the third virtual action icon 424c within the environment.

According to some embodiments, the wearer/user "A" may activate the input mechanism to initiate and/or execute the third action/command associated with the third virtual action icon 424c. In some embodiments, activation of the third virtual action icon 424c (and/or an indication of input associated therewith) may cause the fourth instance of the interface 420d to generate and/or output a third virtual information placeholder 426c. The third virtual information placeholder 426c may, in some embodiments, be assigned and/or associated with a particular type of data, such as a particular tag, metadata, etc. In some embodiments, the third virtual information placeholder 426c may comprise a placeholder that is assigned to one or more high-resolution images, data samples, sensor measurements, etc. In such a manner, for example, an indication of additional data and/or media may be embedded with and/or assigned to the third particular object 408-6.

In some embodiments, the MR device 402 may output and/or the instances of the interface 420a-d may comprise, menu options (not shown) that enable the wearer/user "A" to select, choose, and/or cycle through different available actions/commands/embedded data types. The different instances of the interface 420a-d may be selectively generated and/or output, for example, based on input received from the wearer/user "A". According to some embodiments, the MR device 402 may automatically select, define, and/or output the different instances of the interface 420a-d based on a determination resulting from an execution of an AI embedded data model. The AI embedded data model may, for example, input data descriptive of the environment 408 and/or of the indications of the various user-selected objects 408-4, 408-5, 408-6 and select one or more of the available actions/commands/embedded data types. Based on an image analysis of a burned lawnmower (e.g., lawnmower 408-1), for example, the AI embedded data model may determine that the burned lawnmower 408-1 is a likely cause or origin of the fire and may accordingly select the second virtual information placeholder 426b (e.g., an evidence marker) for output.

Fewer or more components 402, 408, 408-1, 408-2, 408-3, 408-4, 408-5, 408-6, 420a-d, 422, 424a-c, 426a-c, 444a-c and/or various configurations of the depicted components 402, 408, 408-1, 408-2, 408-3, 408-4, 408-5, 408-6, 420a-d, 422, 424a-c, 426a-c, 444a-c may be included in the system 400 without deviating from the scope of embodiments described herein. In some embodiments, the components 402, 408, 408-1, 408-2, 408-3, 408-4, 408-5, 408-6, 420a-d, 422, 424a-c, 426a-c, 444a-c may be similar in configuration and/or functionality to similarly named and/or numbered components as described herein. In some embodiments, the system 400 (and/or portions thereof) may comprise an MR/AI-based fire (and/or safety) investigation analysis program, system, and/or platform programmed and/or otherwise configured to execute, conduct, and/or facilitate the method 600 of FIG. 6 herein, and/or portions thereof.

Figure 7:
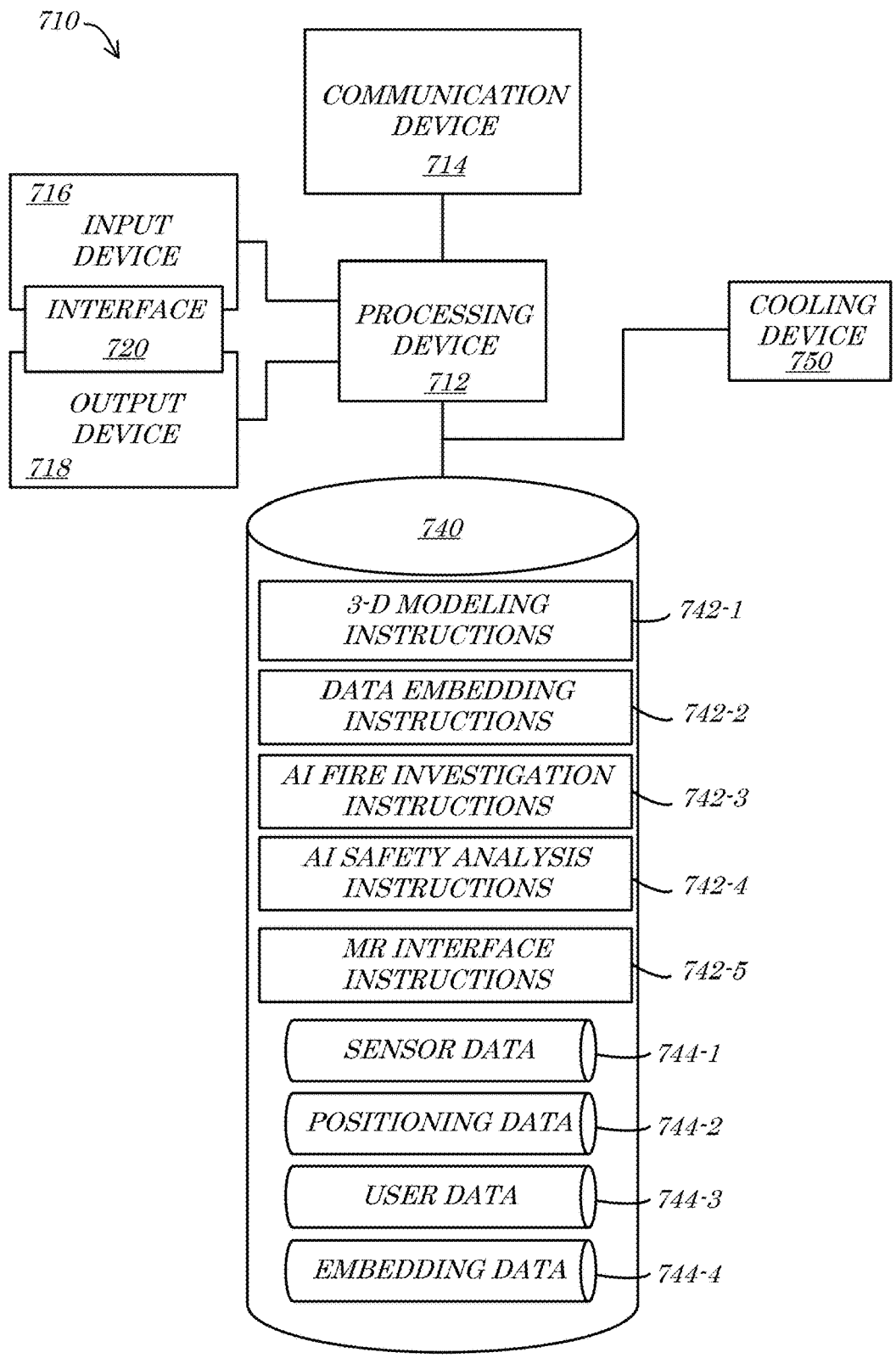
FIG. 7 is a block diagram of an apparatus according to some embodiments.

III. Mixed Reality (MR) and Artificial Intelligence (AI)-Enhanced Fire Investigation Interfaces Turning now to FIG. 5A, FIG. 5B, FIG. 5C, and FIG. 5D, diagrams of example instances of an interface 520a-d according to some embodiments are shown. In some embodiments, the instances of the interface 520a-d may comprise one or more instances or versions of a web page, web form, database entry form, Application Programming Interface (API), spreadsheet, table, map interface, MR or AR input/output, and/or application or other GUI via which data descriptive of a real-world environment (not shown; e.g., the environment 108 of FIG. 1 herein) is input and/or output. The instances of the interface 520a-d may, for example, comprise a front-end of an MR and AI-facilitated or enabled fire and/or safety investigation and/or multilayer data embedding program and/or platform programmed and/or otherwise configured to execute, conduct, and/or facilitate the method 600 of FIG. 6 herein, and/or portions thereof. In some embodiments, the instances of the interface 520*a*-*d* may be output via a computerized device, such as the one or more of the user/MR devices 102, 202*a*-*c*, 302, 402, the controller device/server 110, 210, and/or the apparatus 710 of FIG. 1, FIG. 2, FIG. 3A, FIG. 4A, and/or FIG. 7 herein. According to some embodiments, the instances of the interface 520*a*-*d* may be output via (and are accordingly at least partial representations of) a see-through display device of an MR device (not shown).

In some embodiments, any or all of the example instances of the interface 520*a*-*d* may be output based on acquired data that is descriptive of the real-world environment at a particular location—e.g., address, parcel, building, room, etc. According to some embodiments, and with reference to FIG. 5A, a first instance of the interface 520*a* may comprise, define, and/or depict various data elements 544*a*-*e*, such as a 3-D point cloud coordinate grid 544*a*, and/or a 3-D wire-mesh model 546. The 3-D point cloud coordinate grid 544*a* may comprise an indication of a particular plane or frame of reference, e.g., for two (2) particular coordinate dimensions or axes, for example, and/or the 3-D wire-mesh model 546 may comprise a computed spatial model (e.g., a DEM, surface model, etc.) that is generated to represent the 3-D spatial configuration of the underlying real-world location from which the data (e.g., sensor data) was captured, measured, recorded, and/or acquired.

Figure 5A:
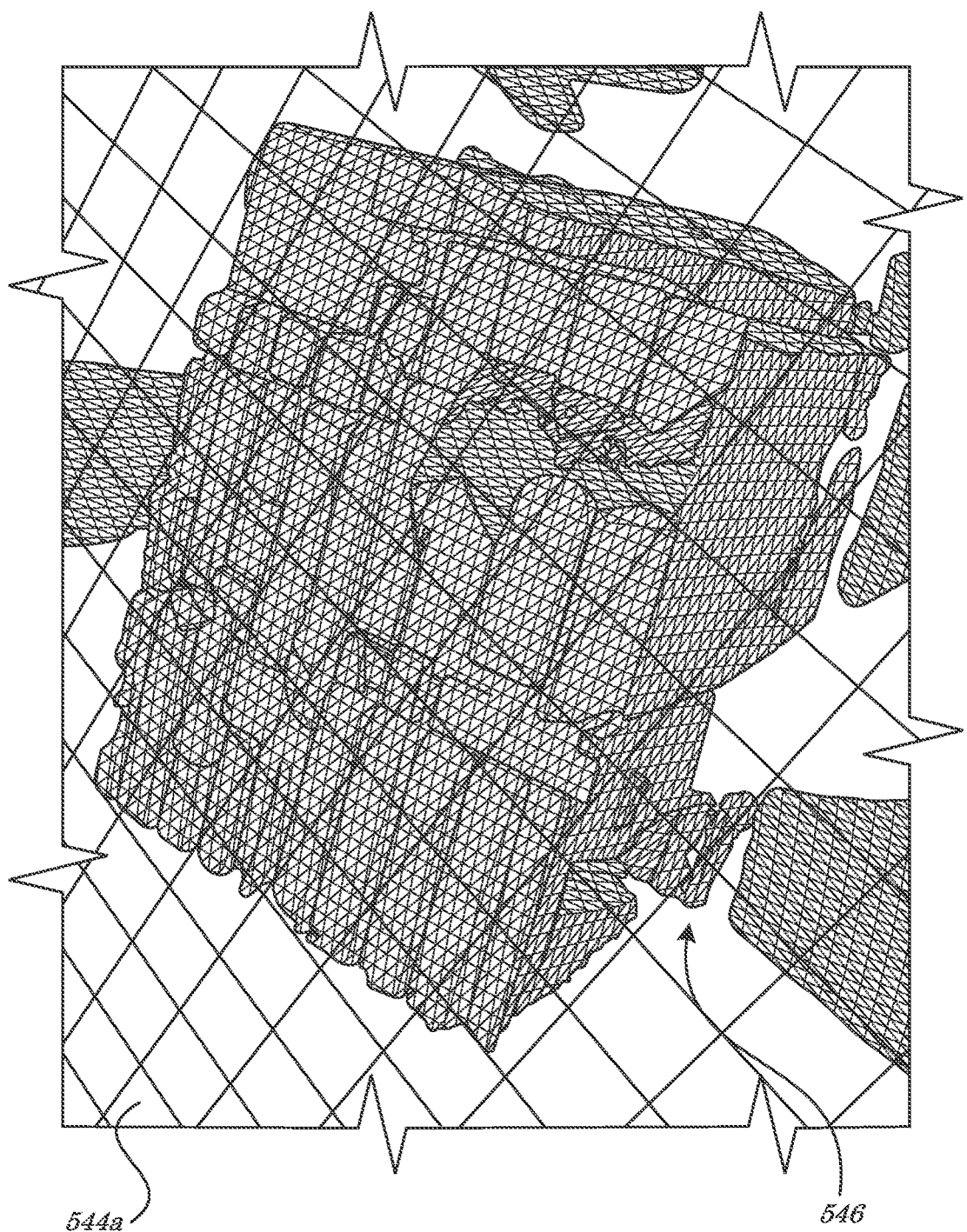
FIG. 5A, FIG. 5B, FIG. 5C, and FIG. 5D are diagrams of example interfaces according to some embodiments.
Figure 5B:
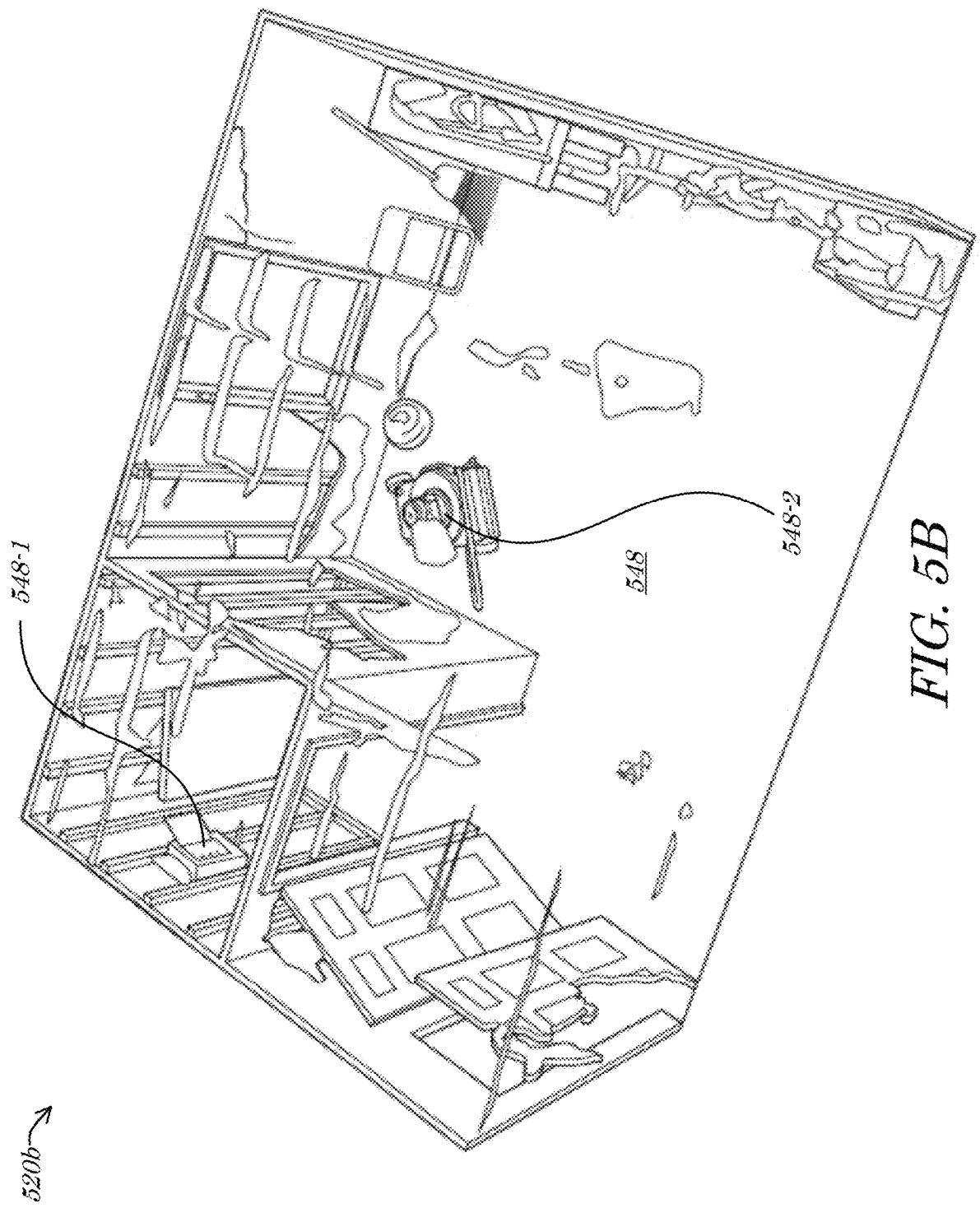

According to some embodiments, and with reference to FIG. 5B, a second instance of the interface 520*b* may comprise, define, and/or depict a 3-D model 548 of the underlying real-world location from which the data (e.g., sensor data) was captured, measured, recorded, and/or acquired. The 3-D model 548 may, for example, comprise a model generated utilizing a combination of the 3-D wire-mesh model 546 and sensor data, such as low-resolution images, such that the sensor data is mapped, stitched, and/or overlaid onto the 3-D wire-mesh model 546 to generate and/or define the 3-D model 548. As depicted in FIG. 5B, the 3-D model 548 may comprise a virtual representation of the real-world location, including spatial orientations, sizes, colors, textures, features, and/or attributes thereof. In some embodiments, the 3-D model 548 may include virtual representations of various objects 548-1, 548-2, such as a first object 548-1 (e.g., an electrical panel) and a second object 548-2 (e.g., a lawnmower; or the burnt remains thereof). As described herein, in some embodiments an MR device may be utilized to embed, link, and/or layer information with respect to a particular point, line, area, and/or object of the 3-D wire-mesh model 546 (and/or the 3-D model 548).

In some embodiments, the 3-D model 548 may be scaled and/or rendered to facilitate observation and/or analysis. The 3-D model 548 may, for example, be scaled to a portion of the real-world size and/or dimensions, such as being scaled down to ten percent (10%) of the real-world size to create a "dollhouse" model or version that may be easily manipulated, interacted with, explored, and/or otherwise utilized, e.g., by a fire investigator, analyst, etc. According to some embodiments, the scaled-down version of the 3-D model 548 may be rendered and/or provided to a viewer in a Virtual Reality (VR) environment, e.g., as output via a VR headset (not shown). In some embodiments, the scaled-down version of the 3-D model 548 may be rendered and/or provided to a viewer in a real-world space, such as an AR or MR projection onto a real-world table or surface (not shown).

According to some embodiments, the 3-D model 548 may be recorded and/or generated to provide training assistance to new fire investigators. The 3-D model 548 may be presented to a trainee at some time after an initial walk-through from which the 3-D model 548 is generated, for example, such as via VR output at a training center (not shown; e.g., remote from the original real-world environment from which the 3-D model 548 was created. According to some embodiments, actions and/or movements of the trainee through the VR environment version of the 3-D model 548 may be recorded and/or compared to the actions and/or movements of the original fire investigator to generate a training score for the trainee (e.g., by quantifying deviations of the trainee's actions/movements from those of the original investigator). In some embodiments, the 3-D model 548 may be scaled to fit or match with a training environment. In a case where the training environment comprises a five hundred square foot (500-ft$^2$) space and the original location from which the 3-D model 548 is generated comprises a one thousand square foot (1,000-ft$^2$) space, actions/movements of the trainee in the VR environment may be scaled (e.g., by a factor of two (2)) such that the trainee is able to navigate throughout the entire 3-D model 548 while remaining in the more constrained training space provided (e.g., without running into real-world boundaries such as walls). According to some embodiments, the scaling may be configured such that real-world training facility surfaces and/or objects such as walls are forced to correspond to locations of objects 548-1, 548-2 within the 3-D model 548.

Figure 5C:
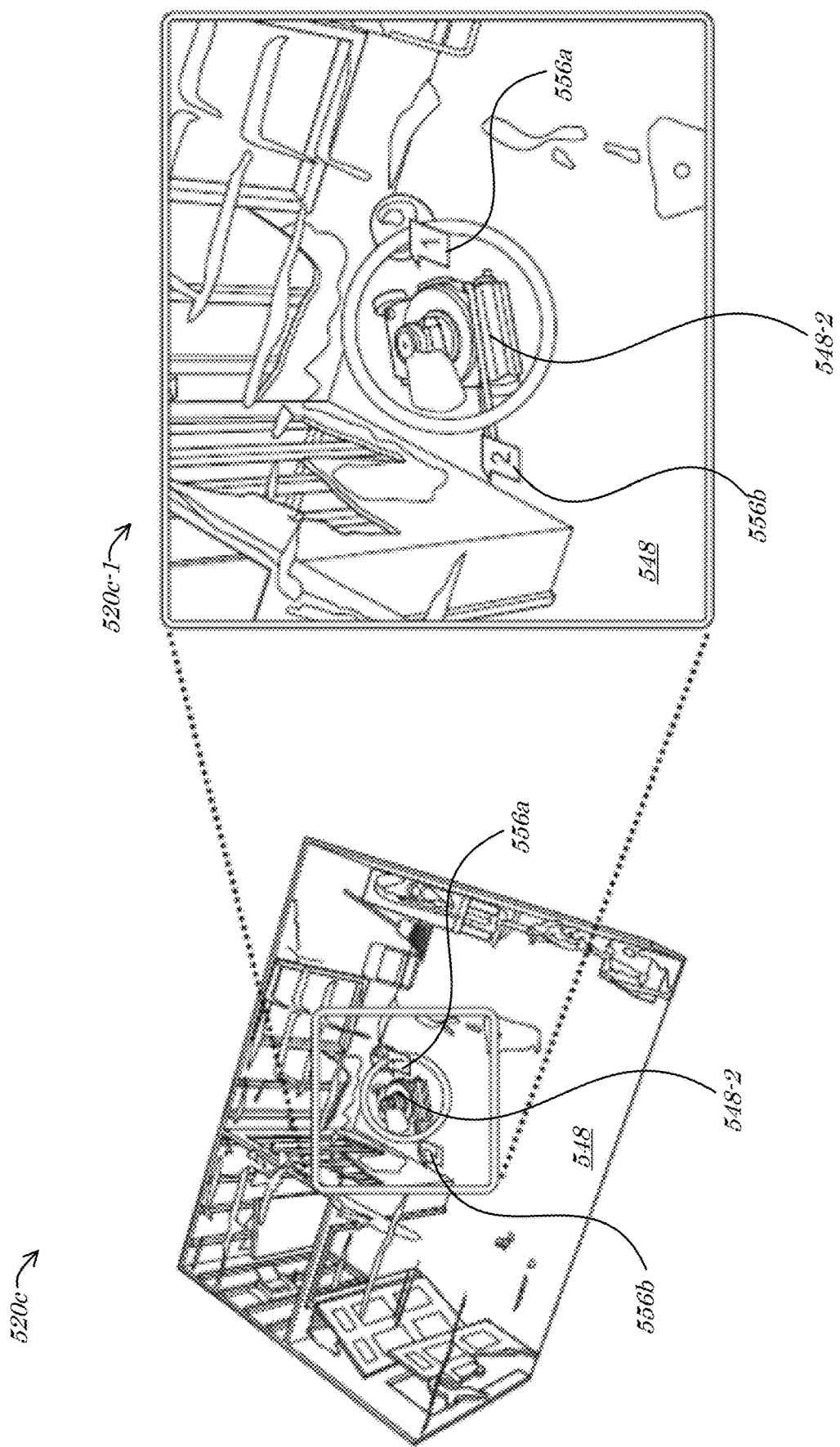

In some embodiments, and with reference to FIG. 5C, a third instance of the interface 520*c* may comprise a representation of the 3-D model 548 with embedded data indicators 556*a*-*b*. According to some embodiments, a zoomed-in, magnified, and/or otherwise differently-scaled sub-interface 520*c*-1 may provide a better view of the embedded data indicators 556*a*-*b* (to the user and/or for ease of illustration herein) and/or the portions of the 3-D model 548 associated therewith (e.g., the lawnmower 548-2). In some embodiments, the embedded data indicators 556*a*-*b* may be output with different sizes, colors, shapes, animations, etc., to indicate different types, levels of importance, temporal aspects, and/or other attributes of the data embedded in or with respect to the 3-D model 548. As depicted solely for purposes of non-limiting example in FIG. 5C, for example, each of a first embedded data indicator 556*a* and a second embedded data indicator 556*b* may comprise graphical representations of evidence placards. In some embodiments, a user (not shown), such as a wearer of a head-mounted MR device with a see-through display via which the third instance of the interface 520*c* is output, may select one or more of the embedded data indicators 556*a*-*b* to cause an outputting, transmittal, and/or providing of the embedded data, media, etc. Utilizing a pointer device (not shown), voice commands, eye movements and/or gestures (e.g., blinking), and/or other input objects, for example, the user may select the first embedded data indicator 556*a* and be provided with an outputting of a first instance of evidence (not shown), such as a chemical sample (and/or analysis results thereof), an acquired piece of evidence (also not shown), such as a match or lighter, etc.

Figure 5D:
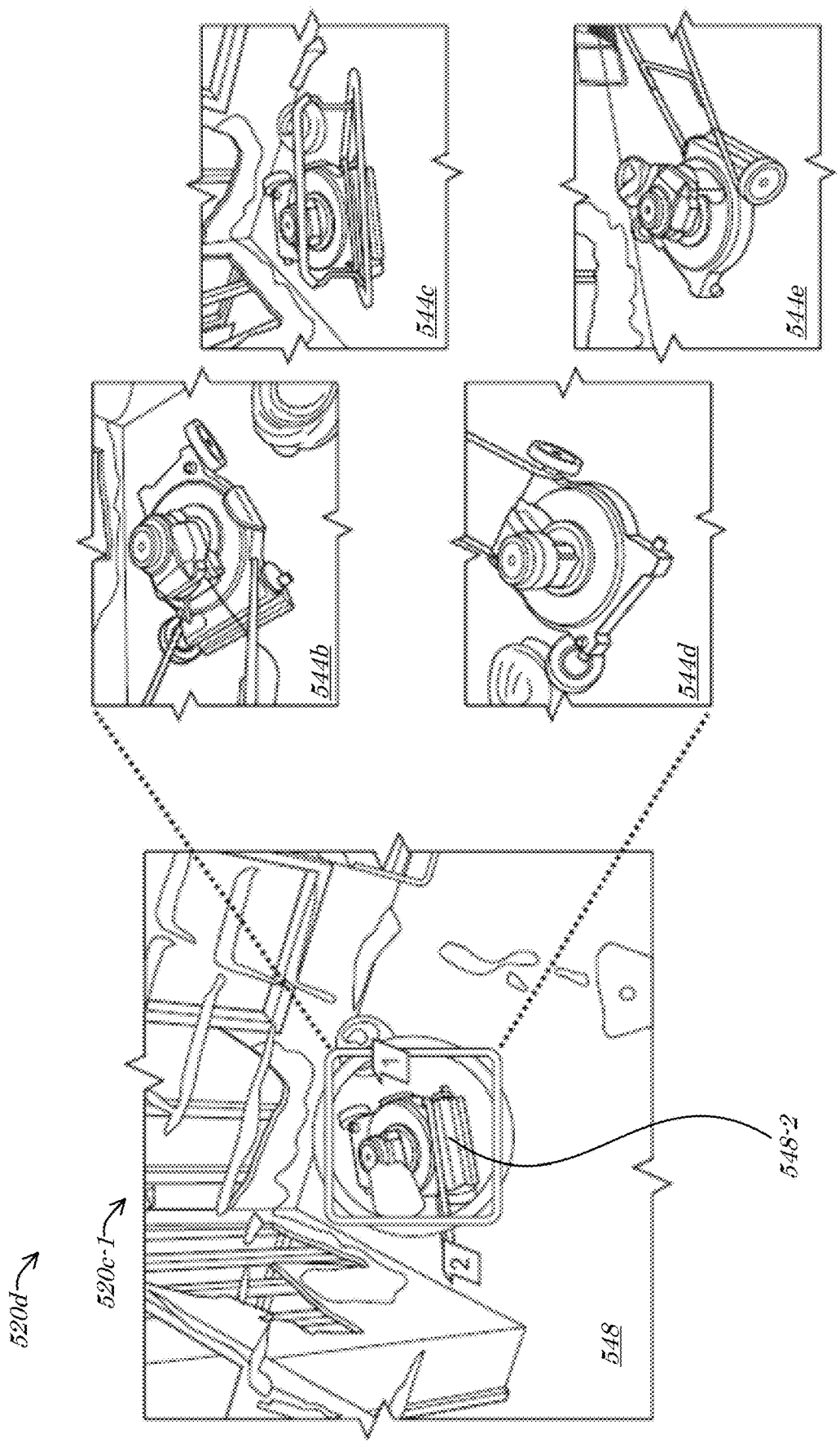

According to some embodiments, whether triggered by a selection of one or more of the embedded data indicators 556*a*-*b* of the third instance of the interface 520*c* or whether triggered by selection and/or input defining a different type of indicator (not shown) and/or interface element, the user may provide an indication (and the MR device may accordingly receive the indication) of a selection of embedded data, e.g., with respect to the lawnmower 548-2. In some embodiments, the selection of the embedded data may cause a fourth version of the interface 520*d* as depicted in FIG. 5D to be output. In some embodiments, the fourth version of the interface 520*d* may comprise and/or define the sub-interface 520*c*-1 showing the portion of the 3-D model 548 comprising the lawnmower 548-2 and the embedded data indicators 556*a-b*. According to some embodiments, the fourth version of the interface 520*d* may comprise a plurality of embedded data elements 544*b-e* that are output, displayed, and/or provided in response to the user's selection/input. The embedded data elements 544*b-e* may comprise, as described herein, any type of data that is descriptive of the underlying real-world environment, such as, but not limited to, text and/or voice notes, diagrams, sensor readings, samples, analysis results, and/or images. As depicted in FIG. 5D for purposes of non-limiting example, in some embodiments the embedded data elements 544*b-e* may comprise images (e.g., high-resolution images). In the case that the 3-D model 548 is generated utilizing low-resolution images (not shown), it may be difficult for an investigator (or tribunal) to adequately discern details of the lawnmower 548-2, which may, for example, be a suspected ignition source and/or fire origin. In accordance with embodiments described herein, the embedded data elements 544*b-e* may be acquired/captured and tagged to and/or embedded with the portion of the 3-D model 548 that corresponds to (and/or defines) the lawnmower 548-2. High-resolution imagery captured by a DSLR camera (not shown), for example, may be saved as the embedded data elements 544*b-e*, and later selection of the first embedded data indicator 556*a* (for example), may cause the embedded data elements 544*b-e* to be loaded from memory and displayed to a user (e.g., in response to the user's selection). In some embodiments, the high-resolution images of the embedded data elements 544*b-e* may provide a more accurate and detailed record of the lawnmower 548-2 (and/or the surrounding area), thereby facilitating a fire investigation assessment of the room for which the 3-D model 548 has been generated.

While various components of the example instances of the interface 520*a-d* have been depicted with respect to certain labels, layouts, headings, titles, graphical elements, and/or configurations, these features have been presented for reference and example only. Other labels, layouts, headings, titles, graphical elements, and/or configurations may be implemented without deviating from the scope of embodiments herein. Similarly, while a certain number of tabs, information screens, form fields, and/or data entry options have been presented, variations thereof may be practiced in accordance with some embodiments.

Fewer or more components 520*c*-1, 544*a-e*, 546, 548, 548-1, 548-2, 556*a-b* and/or various configurations of the depicted components 520*c*-1, 544*a-e*, 546, 548, 548-1, 548-2, 556*a-b* may be included in the example instances of the interface 520*a-d* without deviating from the scope of embodiments described herein. In some embodiments, the components 520*c*-1, 544*a-e*, 546, 548, 548-1, 548-2, 556*a-b* may be similar in configuration and/or functionality to similarly named and/or numbered components as described herein. In some embodiments, the example instances of the interface 520*a-d* (and/or portions thereof) may comprise an MR/AI-based fire (and/or safety) investigation analysis program, system, and/or platform programmed and/or otherwise configured to execute, conduct, and/or facilitate the method 600 of FIG. 6 herein, and/or portions thereof.

IV. Mixed Reality (MR) and Artificial Intelligence (AI)-Enhanced Fire Investigation Processes Referring now to FIG. 6, a flow diagram of a method 600 according to some embodiments is shown. In some embodiments, the method 600 may be performed and/or implemented by and/or otherwise associated with one or more specialized and/or specially-programmed computers (e.g., one or more of the user/MR devices 102, 202*a-c*, 302, 402, the controller device/server 110, 210, and/or the apparatus 710 of FIG. 1, FIG. 2, FIG. 3A, FIG. 4A, and/or FIG. 7 herein), computer terminals, computer servers, computer systems and/or networks, and/or any combinations thereof (e.g., by one or more multi-threaded and/or multi-core processing units of an MR/AI-based fire (and/or safety) investigation analysis system). In some embodiments, the method 600 may be embodied in, facilitated by, and/or otherwise associated with various input mechanisms and/or interfaces (such as the interfaces 320, 420*a-d*, 520*a-d*, 720 of FIG. 3A, FIG. 4B, FIG. 4C, FIG. 4D, FIG. 4E, FIG. 5A, FIG. 5B, FIG. 5C, FIG. 5D, and/or FIG. 7 herein).

Figure 8A:
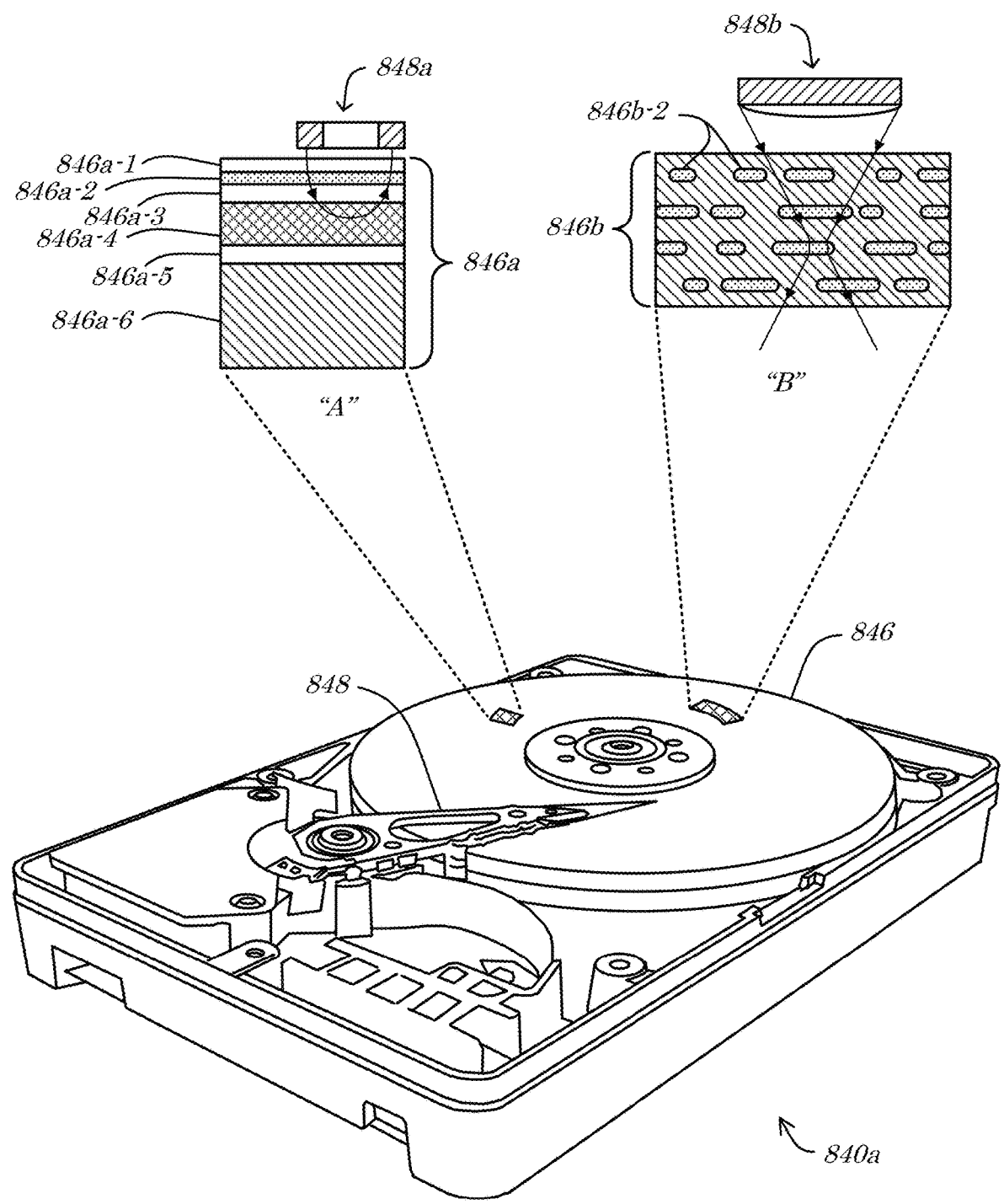
FIG. 8A, FIG. 8B, FIG. 8C, FIG. 8D, and FIG. 8E are perspective diagrams of exemplary data storage devices according to some embodiments.
Figure 8B:
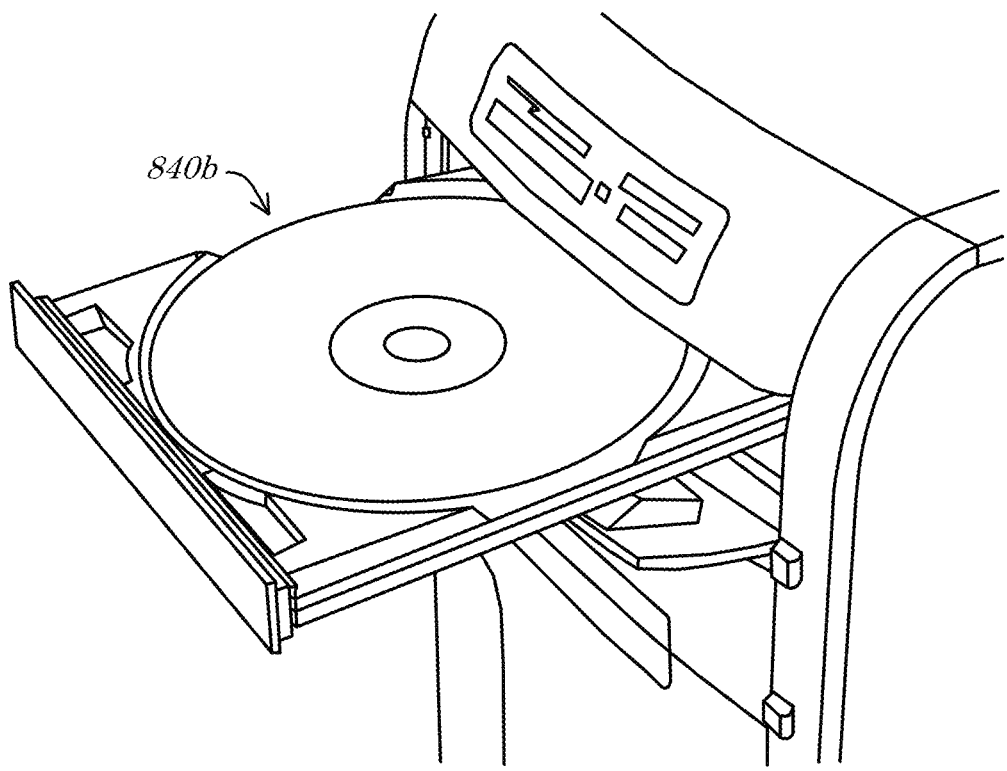
Figure 8C:
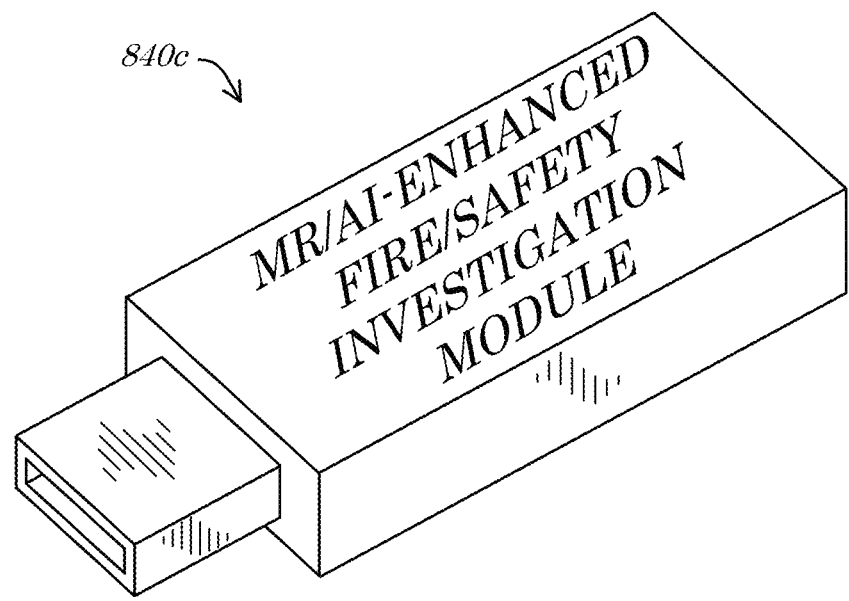
Figure 8D:
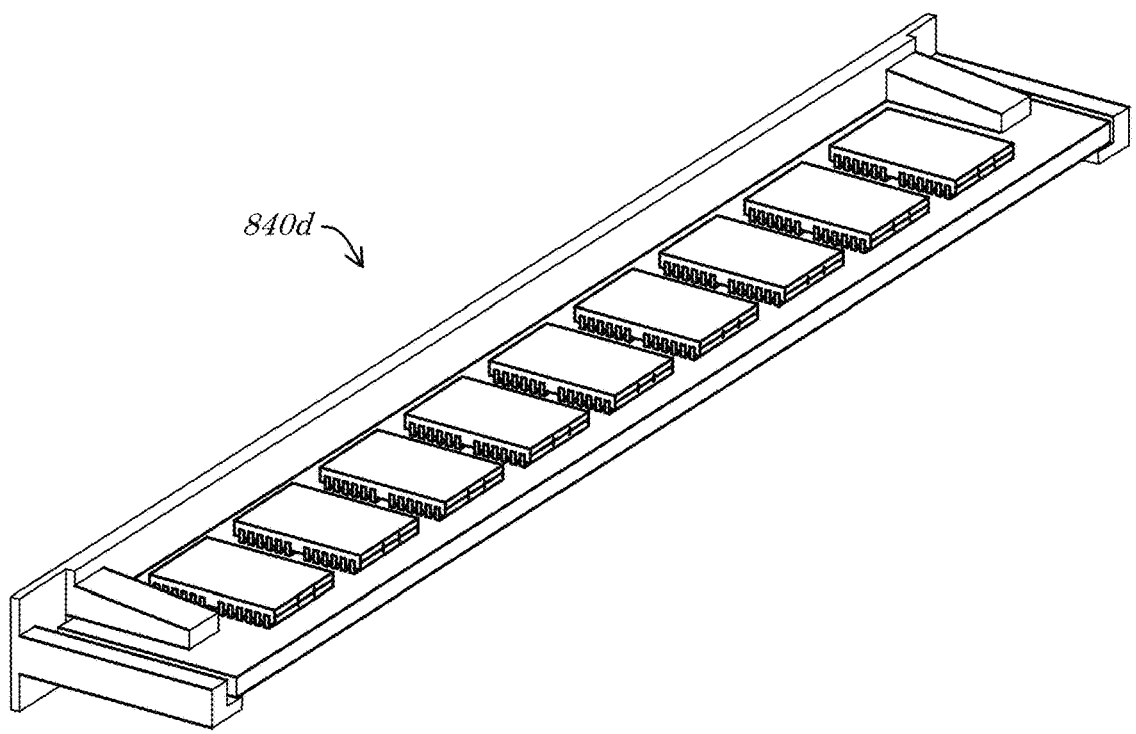
Figure 8E:
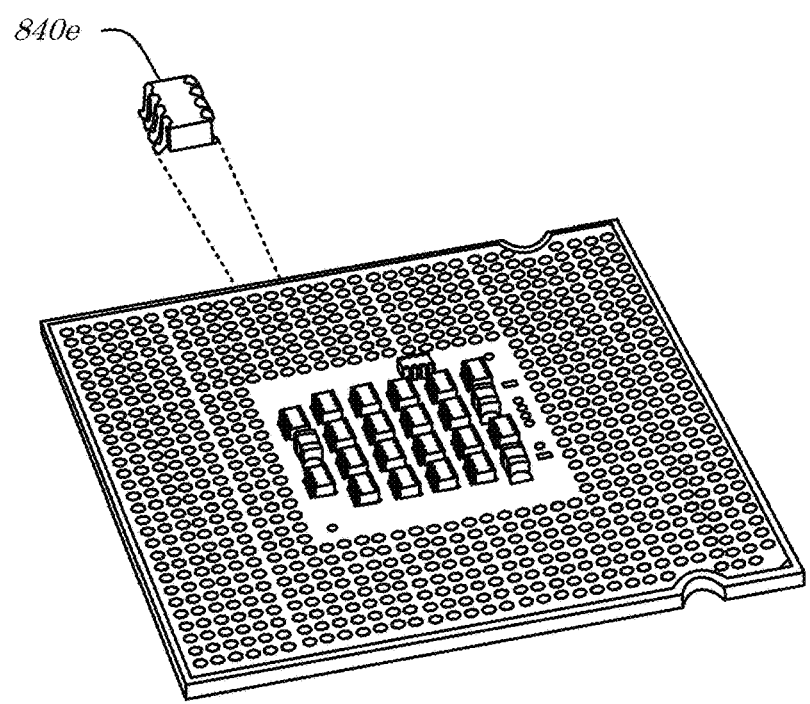

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240*a-b*, 340, 840*a-e* of FIG. 1, FIG. 2, FIG. 3A, FIG. 8A, FIG. 8B, FIG. 8C, FIG. 8D, and/or FIG. 8E herein) may store thereon instructions that when executed by a machine (such as a computerized processor) result in performance according to any one or more of the embodiments described herein.

In some embodiments, the method 600 may comprise acquiring (e.g., by an electronic processing device (e.g., of an MR device) and/or from a sensor/imaging device) data descriptive of first distances from an MR device to a first plurality of surface points in an environment, at 602. One or more sensors, such as cameras, data transceivers, range finding devices, a ToF sensor, and/or other imagery and/or data acquisition devices, may, for example, be utilized to capture data descriptive of a location that includes one or more points, attributes, and/or objects, such as features and/or furnishings of a room in a building (e.g., a fire-damaged building or room). According to some embodiments, the data may be acquired by a ToF sensor at a first time and/or from a first location in the environment in which a wearer of a head-mounted see-through display of the MR device is located. In some embodiments, the capturing of the data may occur in response to a request for the data. One or more signals may be transmitted from a user and/or controller device to one or more sensor (e.g., the ToF sensor) and/or imaging devices, for example, to initiate and/or conduct data acquisition for one or more desired locations and/or objects. According to some embodiments, whether the data is captured on-demand, in response to a specific request, or as part of an overall data acquisition process, the data may be provided via one or more data storage devices, such as a data/imagery repository, and/or may be stored therein. According to some embodiments, the data may comprise any quantity, type, and/or configuration of data that is or becomes known or practicable. The data may include, for example, a plurality of data bands, such as different color bands and/or various point data, such as elevations, locations, etc. In some embodiments, the data may comprise various imagery bands, such as visible colors (e.g., RGB), near-IR, IR, and/or point cloud data, such as a Digital Elevation Model (DEM). According to some embodiments, the image/data may comprise a real-time image capture of the data with respect to the first plurality of surface points in the environment that, e.g., are disposed within a first field of view of the sensor (e.g., a first FoV of a camera).

According to some embodiments, the method 600 may comprise computing (e.g., by the electronic processing device) a first portion of a 3-D point cloud descriptive of locations of the first plurality of surface points in the environment, at 604. The MR device may, for example, utilize the first distances and the first location to calculate spatial orientations between the first plurality of surface points in the environment. According to some embodiments, various formulas and/or models may be employed (e.g., an AI spatial orientation model) to derive, define, and/or otherwise compute the first portion of the 3-D point cloud. In the case that the data comprises two-dimensional sensor data, such as a two-dimensional image, relative locations of any or all objects may be estimated based on isometric analysis and/or estimation, e.g., based on image/data parameters, such as parallax, camera/sensor location, lens/sensor configuration data and/or specifications, and/or light/shadow angle analysis. In some embodiments, the image/sensor data may comprise multiple images and/or readings from different angles, orientations, and/or positions, permitting object locations to be derived based on stereoscopic analysis. According to some embodiments, positioning and/or location data may be obtained directly from the distance and/or location data, such as LiDAR and/or other ranging data (e.g., a point cloud and/or DEM data) acquired as part of and/or with the image/reading, and/or from location data received from one or more of the objects. An object itself may provide absolute location information, such as a set of coordinates, GPS data, etc. According to some embodiments, estimated locations may be derived by evaluating the data utilizing a mathematical parallax model to calculate a viewpoint location based on the locations of one or more identified fixed features, such as room corners, in the image(s)/data. The curvature and/or distances between lines and/or artifacts in the image/data may be utilized as input, in some embodiments, to calculate an estimated distance of the viewpoint to each of the identified objects (e.g., surface points). In such a manner, for example, relative locations of the objects with respect to the sensor/camera and/or with respect to each other may be computed. In some embodiments, each pixel and/or other identifiable subportion or element of the image (s)/data may be assigned a coordinate and/or value, such as a unique and/or sequential identifier. In some embodiments, each pixel or element may be assigned multiple values that together uniquely identify the pixel/element. In the case of a two-dimensional image/data, for example, each pixel/element may be assigned two values, e.g., one for each axis or dimensional direction. According to some embodiments, additional values (e.g., dimensional values) may be assigned, depending upon the content of the underlying and/or original image/sensor data. According to some embodiments, three-dimensional positioning data may be utilized, such as a first value with respect to a first dimension (e.g., an x-axis or horizontal direction), a second value with respect to a second dimension (e.g., a y-axis or vertical direction), and/or a third value with respect to a third dimension (e.g., a z-axis or depth direction; e.g., with respect to a depth datum, such as the calculated/derived sensor/camera position). In some embodiments, the first portion of the 3-D point cloud may comprise a set of data that is stored (e.g., in a memory device) and that is descriptive of the computed spatial relations, locations, etc., e.g., of the first plurality of surface points in the environment.

In some embodiments, the method 600 may comprise tracking (e.g., by the electronic processing device and/or an IMU device) a first movement of the wearer from the first location in the environment to a second location in the environment, at 606. Revised and/or updated sensor data may be utilized, for example, to identify a new/updated location of the first plurality of surface points in the environment with respect to the MR device, at a point in time after the initial identification/location computation. According to some embodiments, such information may be utilized to compute and/or derive a new and/or updated location of the MR device/wearer. In some embodiments, one or more IMU devices of the MR device may capture, read, track, monitor, and/or otherwise acquire movement data (e.g., based on accelerations, velocities, pressures, angles, orientations, and/or other measurable attributes) and provide such data to the electronic processing device(s) of the MR device (and/or may store the data in a memory device of the IMU and/or MR device). The tracking may occur and/or be triggered to be conducted after the acquiring of the first distances.

According to some embodiments, the method 600 may comprise acquiring (e.g., by the electronic processing device (e.g., of the MR device) and/or from the sensor/imaging device) data descriptive of second distances from the MR device to a second plurality of surface points in the environment, at 608. The one or more sensors, such as cameras, data transceivers, range finding devices, the ToF sensor, and/or other imagery and/or data acquisition devices, may, for example, be utilized to capture data descriptive of the location that includes one or more points, attributes, and/or objects, such as features and/or furnishings of the room in the building (e.g., the fire-damaged building or room). According to some embodiments, the data may be acquired by the ToF sensor at a second time and/or from a second location in the environment in which the wearer of the head-mounted see-through display of the MR device is located. In some embodiments, the capturing of the data may occur in response to a request for the data. One or more signals may be transmitted from the user and/or controller device to one or more sensors (e.g., the ToF sensor) and/or imaging devices, for example, to initiate and/or conduct updated and/or new data acquisition for one or more desired locations and/or objects. According to some embodiments, whether the data is captured on-demand, in response to a specific request, or as part of an overall data acquisition process, the data may be provided via one or more data storage devices, such as the data/imagery repository, and/or may be stored therein. According to some embodiments, the data may comprise any quantity, type, and/or configuration of data that is or becomes known or practicable. The data may include, for example, a plurality of data bands, such as different color bands and/or various point data, such as elevations, locations, etc. In some embodiments, the data may comprise various imagery bands, such as visible colors (e.g., RGB), near-IR, IR, and/or point cloud data, such as the DEM. According to some embodiments, the image/data may comprise a real-time image capture of the data with respect to the second plurality of surface points in the environment that, e.g., are disposed within a second field of view of the sensor (e.g., a second FoV of the camera).

In some embodiments, the method 600 may comprise computing (e.g., by the electronic processing device) a second portion of the 3-D point cloud descriptive of locations of the second plurality of surface points in the environment, at 610. The MR device may, for example, utilize the second distances and the second location to calculate spatial orientations between the second plurality of surface points in the environment. According to some embodiments, various formulas and/or models may be employed (e.g., the AI spatial orientation model) to derive, define, and/or otherwise compute the second portion of the 3-D point cloud. In the case that the data comprises two-dimensional sensor data, such as a two-dimensional image, relative locations of any or all objects may be estimated based on isometric analysis and/or estimation, e.g., based on image/data parameters, such as parallax, camera/sensor location, lens/sensor configuration data and/or specifications, and/or light/shadow angle analysis. In some embodiments, the image/sensor data may comprise multiple images and/or readings from different angles, orientations, and/or positions, permitting object locations to be derived based on stereoscopic analysis. According to some embodiments, positioning and/or location data may be obtained directly from the distance and/or location data, such as LiDAR and/or other ranging data (e.g., the point cloud and/or DEM data) acquired as part of and/or with the image/reading, and/or from location data received from one or more of the objects. An object itself may provide absolute location information, such as a set of coordinates, GPS data, etc. According to some embodiments, estimated locations may be derived by evaluating the data utilizing the mathematical parallax model to calculate a second viewpoint location based on the locations of one or more identified fixed features, such as room corners, in the image(s)/data. The curvature and/or distances between lines and/or artifacts in the image/data may be utilized as input, in some embodiments, to calculate an estimated distance of the second viewpoint to each of the identified objects (e.g., surface points). In such a manner, for example, relative locations of the objects with respect to the sensor/camera and/or with respect to each other may be computed. In some embodiments, each pixel and/or other identifiable subportion or element of the image(s)/data may be assigned a coordinate and/or value, such as a unique and/or sequential identifier. In some embodiments, each pixel or element may be assigned multiple values that together uniquely identify the pixel/element. In the case of a two-dimensional image/data, for example, each pixel/element may be assigned two values, e.g., one for each axis or dimensional direction. According to some embodiments, additional values (e.g., dimensional values) may be assigned, depending upon the content of the underlying and/or original image/sensor data. According to some embodiments, three-dimensional positioning data may be utilized, such as a first value with respect to a first dimension (e.g., an x-axis or horizontal direction), a second value with respect to a second dimension (e.g., a y-axis or vertical direction), and/or a third value with respect to a third dimension (e.g., a z-axis or depth direction; e.g., with respect to a depth datum, such as the calculated/derived sensor/camera position). In some embodiments, the second portion of the 3-D point cloud may comprise a set of data that is stored (e.g., in a memory device) and that is descriptive of the computed spatial relations, locations, etc., e.g., of the second plurality of surface points in the environment.

According to some embodiments, the method 600 may comprise generating (e.g., by the electronic processing device) a 3-D wire mesh model descriptive of the environment, at 612. The first and second portions of the 3-D point cloud may be combined and/or joined, for example, to define the 3-D wire mesh model. In some embodiments, a wire mesh generation algorithm may process the locations, positions, and/or attributes of the first and second plurality of surface points in the environment to define mesh surface connections between points. In such a manner, for example, a model that approximates surfaces in the environment can be derived. According to some embodiments, the wire mesh model may comprise data defining surfaces of the environment and/or may comprise a mathematical model that may be utilized to compute surface, point, and/or line information descriptive of the environment. According to some embodiments, the method 600 may proceed and/or continue to, and/or otherwise comprise, a set of processes under a first node "A" and/or a set of processes under a second node "B".

In some embodiments (and proceeding under the first node "A"), the method 600 may comprise receiving (e.g., by the electronic processing device and/or via a wireless network and/or receiver) sensor data and positioning information, at 614. According to some embodiments, the data acquired and/or utilized to develop the 3-D point cloud and 3-D wire mesh model may be based on data received from a first sensor, such as a camera and/or ToF sensor built in and/or coupled to the MR device (e.g., worn on the wearer). In some embodiments, the sensor and positioning information may be received from a second sensor device that is not coupled to and/or built into the MR device. In some embodiments, the second sensor device may comprise a device that is capable of being docked with and/or attached to the MR device, such as the first sensor, but has been undocked and/or removed from the MR device and is at a current time not coupled thereto. The second sensor may comprise, for example, the first sensor that has been detached from the MR device (e.g., headset), a handheld pointer device, a separate LiDAR and/or camera device (such as a DSLR camera), etc. In some embodiments, the sensor data received (e.g., from the second sensor) may comprise data descriptive of the environment, such as images, temperature readings, air quality measurements, etc., that are particularly descriptive and/or associated with one or more points, lines, areas, and/or other objects in the environment. In the case of a hand-held pointer comprising a temperature sensor or a DSLR camera, as a second sensor for example, each may acquire and/or record the sensor data descriptive of a particular point (e.g., in the case of a certain type of temperature reading) or area (e.g., in the case of a high-resolution DSLR image). According to some embodiments, the particular point or area may be within a FoV of the MR device (e.g., a FoV of the see-through display, of the camera, and/or of the ToF sensor thereof).

According to some embodiments, the second sensor may comprise a wireless transmitter device that sends a wireless signal indicative of the sensor data to a wireless receiver device of the MR device. In some embodiments, the positioning information of the sensor data may comprise information descriptive of a location, altitude, distance, bearing, heading, orientation, and/or other location-based data descriptive of the position of the second sensor (e.g., relative to the MR device and/or absolute, such as a GPS coordinate). In some embodiments, the second sensor device may comprise a plurality of devices that provide the various sensor data and/or positioning information to the MR device. A standalone (e.g., separate from the MR device) DSLR camera with an IMU and/or wireless communication device (e.g., WiFi®, Bluetooth®, etc.) may, for example, capture a high-resolution image of a particular area of the environment—e.g., being disposed to do so by operating from a particular location and being oriented in a particular direction. In some embodiments, the high-resolution image data may be sent to the MR device (e.g., and received as the sensor data). According to some embodiments, whether the DSLR provides positioning information or not, a hand-held pointer device in wireless communication with the MR device may be utilized by the wearer to point to a particular point, area, line, object, etc., such as a point within the particular area of the environment for which the high-resolution image was captured (by the separate DSLR camera). In some embodiments, the pointer may be utilized to send a signal indicative of the point (e.g., a point selected by the wearer/user) to the MR device. The signal may, for example, comprise positioning information descriptive of a location, altitude, distance, bearing, heading, orientation, and/or other location-based data descriptive of the point and/or the pointer device. According to some embodiments, sensor data and/or positioning information may be received by the MR device from a plurality of second sensor devices and/or may be acquired, at least in part, from an on-board, built-in, and/or coupled device, such as an onboard low-resolution camera, ToF sensor, etc.

In some embodiments, the method 600 may comprise identifying (e.g., by the electronic processing device) a portion of the 3-D wire mesh model that corresponds to the data descriptive of the environment that has been captured by the sensor device, at 616. Utilizing the known (e.g., stored and/or computed) positioning information descriptive of the MR device (e.g., within the environment), for example, the MR device may compare the received positioning information from the second sensor(s), and derive and/or compute a spatial relationship between the second sensor, the point/area/object in the environment indicated by the sensor data and/or positioning information, and/or the MR device. Utilizing the spatial relationship data, the MR device may identify the point/area/object and/or the 3-D point cloud and/or 3-D wire mesh model position corresponding thereto. In some embodiments, the identified portion may be determined to be a one-to-one match with the indicated location relating to the sensor data. In the case that the sensor data comprises a temperature reading for a particular point on an object, for example, the corresponding point on the 3-D wire mesh (and/or in the 3-D point cloud) may be identified as matching. In the example case of a high-resolution image being received from a DSLR camera and a pointer device (which may, or may not, comprise the DSLR camera) indicating a particular point in the environment, although the high-resolution image represents data for a plurality of points in the environment (e.g., a particular area (or volume) thereof), the indicated point may be identified as a single corresponding point of the 3-D wire mesh.

According to some embodiments, the method 600 may comprise assigning (e.g., by the electronic processing device) an attribute representative of the data descriptive of the environment that has been captured by the sensor device, at 618. The corresponding portion(s) of the 3-D wire mesh model may, for example, be appended, tagged, and/or embedded with one or more pointers, tags, and/or data elements indicative and/or descriptive of the sensor data. According to some embodiments, the assignment may comprise a link or pointer (e.g., an embedded identifier) stored with respect to the 3-D wire mesh model (and/or 3-D point cloud) that functions as a reference to the sensor data itself which is stored separately from the assignment data. The assignment data may be stored in a first data store in which the 3-D wire mesh model is stored, for example, while the sensor data (e.g., one or more high-resolution images) may be stored in a second (e.g., remote) data store.

In some embodiments, the method 600 may comprise identifying (e.g., by the electronic processing device) a selection of the portion of the 3-D wire mesh model that corresponds to the data descriptive of the environment that has been captured by the sensor device, at 620. The MR device may receive input from the wearer/user, for example, indicating a selection of a point, line, area, and/or other object of the environment and/or of a portion and/or feature of the MR display, such as an MR element representing a point, line, area, and/or other object of the 3-D wire mesh model. In some embodiments, the selection may be effectuated utilizing the MR device and/or a second sensor and/or peripheral device in communication with the MR device. The wearer/user may utilize a hand-held pointer device, for example, to indicate a point, line, area, and/or other object of the environment and the MR device may identify a location (and/or identity) of the selected point, line, area, and/or other object of the environment, e.g., in the 3-D wire mesh model (and/or 3-D point cloud; e.g., the portion of the 3-D wire mesh mode)). In some embodiments, the wearer/user may define the selection via the see-through display device of the MR device, such as by fixing their gaze on the point, line, area, and/or other object of the environment.

According to some embodiments, the method 600 may comprise outputting (e.g., by the electronic processing device) the sensor data, at 622. The see-through display device and/or an interface generated, defined, and/or output thereby may, for example, output an indication of the stored sensor data that has been assigned to the identified point, line, area, and/or other object of the environment (e.g., the portion of the 3-D wire mesh model). According to some embodiments, the outputting may comprise outputting one or more of a sound, voice, light, light pattern, text, images, video, GUI elements, MR elements, and/or Augmented Reality (AR) elements. The system may, for example, indicate the portion of the 3-D wire mesh model to the wearer/user via an MR and/or AR element output via an interface on the see-through display of the MR device. According to some embodiments, the position of the output element on the display may be established by taking into account the eye position(s) of the wearer/user, the location of the MR device and the orientation of the MR device with respect to the portion of the 3-D wire mesh model. In some embodiments, as the wearer/user shifts their gaze and/or as the MR device is altered in orientation and/or location, the output element may be dynamically changed or updated to reflect proper positioning (e.g., to continue to appear is if it is superimposed at the actual real-world location corresponding to the portion of the 3-D wire mesh model). In some embodiments, an indication of the sensor data may be output in an MR fashion to appear at the portion of the 3-D wire mesh model, while the sensor data (e.g., a high-resolution image) may be output via a separate portion of the interface and/or display, such as via a pop-up window and/or via a separate display device.

In some embodiments, such as in the case that the sensor data comprise a plurality of low-resolution images and/or video, such image data may be mapped to the corresponding areas of the 3-D wire mesh model and such image data may be projected (virtually via the MR display and/or directly onto the real-world objects) onto the wire-mesh model and/or environment. According to some embodiments, the method 600 may comprise projecting (e.g., by the processing device) the one or more images (and/or other data) onto the corresponding portion of the 3-D wire mesh model. In some embodiments, the method 600 may comprise identifying (e.g., by the processing device), for each portion of the one or more images, a corresponding portion of the 3-D wire mesh model and assigning (e.g., by the processing device), to each corresponding portion of the 3-D wire mesh model, a texture attribute representative of the corresponding portion of the one or more images/data. In such a manner, for example, colors, textures, and/or other attributes may be mapped or stitched to the wire-mesh model to permit the wire-mesh model to appear as a more accurate human-visible representation of the real-world environment.

According to some embodiments, the method 600 may utilize additional or "redundant" data to verify the accuracy of the 3-D wire-mesh model. In addition to utilizing the built-in ToF sensor and/or camera to compute and/or define the 3-D wire-mesh model, for example, the MR device may receive data from a second or distal sensor, such as a hand-held or drone-mounted LiDAR scanner. According to some embodiments, the method 600 may comprise receiving a plurality (e.g., one or more) of distance measurements from such a second sensor device and may comprise identifying (e.g., by the processing device), for each portion of the one or more distance measurements, a corresponding portion of the 3-D wire mesh model. In some embodiments, the method 600 may comprise computing (e.g., by the processing device) a difference between (i) a distance between the portion of the 3-D wire mesh model and the location of the sensor LiDAR device (e.g., second sensor) and (ii) the one or more distance measurements. According to some embodiments, the method 600 may comprise computing (e.g., by the processing device), based on the difference, an error metric for the location of the corresponding portion of the 3-D wire mesh model. In such a manner, for example, the 3-D wire mesh model (and/or 3-D point cloud) may be checked, verified, and/or evaluated for accuracy. In some embodiments, such as in the case that the error metric exceeds a predetermined threshold value, level, or range, the 3-D wire mesh model (and/or 3-D point cloud) may be adjusted, edited, and/or recomputed (e.g., utilizing the second sensor data) to compensate for the discrepancy.

In some embodiments (and proceeding under the second node "B"), the method 600 may comprise identifying (e.g., by the electronic processing device) a safety hazard in the environment, at 624. According to some embodiments, the identifying may be conducted by applying and/or executing AI safety rules, logic, application, model, and/or criteria. AI safety logic and/or an AI safety criteria model stored in a memory device of the MR device and/or executed remotely by a server/cloud device may, in some embodiments, analyze data descriptive of the environment to identify, classify, and/or evaluate one or more objects, features, and/or attributes of the environment that may be harmful to the wearer/user (e.g., fire investigator). According to some embodiments, a plurality of shape files and/or patterns (and/or other shape-indicative and/or pattern-indicative information) may be stored in relation to a plurality of identifiable objects, such as room features, furnishings, electronic devices, humans, and/or other characteristics of an environment, and one or more of such files/information may be selected based at least in part on a characteristic of the environment (e.g., the location at which the imagery/data is captured and/or acquired). In some embodiments, for example, it may be determined (e.g., based on geospatial and/or account information) that a particular location/environment comprises an office building or a home. According to some embodiments, such information may be stored in association with a wearer/user account, profile, and/or other identifier and/or retrieved utilizing such an identifier as a data query key. In some embodiments, the shape file may comprise any type, quantity, and/or configuration of shape and/or pattern information that is or becomes practicable, such as, but not limited to, an image file, a template, geospatial vector data, point data, line data, polygon data, coordinate data, and/or other pattern, geometry, color, and/or configuration data. In some embodiments, the shape/pattern file may be defined and/or stored in accordance with one or more data formatting standards, such as the Environmental Systems Research Institute (ESRI) Shapefile Technical Description 3-7855 published July 1998 by ESRI, Inc. of Redlands, CA. In some embodiments, the shape file may define known and/or estimated extents, colors, patterns, and/or geometries of various objects, such as a chair, desk, conference room table, doorway, lawnmower, gas can, computer monitor, etc.

According to some embodiments, portions of the acquired image(s)/data may be compared to one or more stored shape/pattern files (and/or parameters thereof) to identify likely matches (e.g., to identify one or more objects in the environment). As different lighting conditions, viewpoints/angles, and/or different camera/sensor configurations may cause a wide variation in image details, it should be understood that an AI-based program conducting image analysis may generally perform mathematical calculations (e.g., regression, best fit, etc.) to identify "matches" that fall within various parameter ranges, but that perfect mathematical "matches" reaching the level of mathematical equivalence are likely to be rare. Accordingly, portions of the image(s) may be compared to stored shapes, colors, textures, patterns, etc., and in the case that the number of similarities falls within a predetermined threshold, a "match" may be established or identified.

In some embodiments, the identifying may comprise classifying (e.g., by the electronic processing device) the one or more identified objects. Any or all identified objects may, for example, be compared to stored data descriptive of various types, styles, makes, models, etc., of various objects (e.g., types of gases, types of chemicals, consumer products, such as furniture, computers, and/or tools or equipment). According to some embodiments, in the case that a portion of the object(s) is determined to match stored data descriptive of a stored object, corresponding portions of the object may be tagged and/or otherwise identified as a particular type, make, model, etc. In some embodiments, different objects may be identified based on different positioning information derived from the image/data. According to some embodiments, object classification may be at least partially based on data received from one or more of the objects and/or a wearer/user. The wearer/user may provide information identifying a particular type of lawnmower found in the environment, for example, and an identified object may be classified as a lawnmower based on specifications for the particular type of lawnmower. In some embodiments, objects may provide an identifier that is utilized to cross-reference stored data to identify the particular type of object. For example, an identifier may be captured and identified via optical character recognition of a machine and/or human-readable tag, label, sticker, and/or other on-object identifier. In the case of electronic objects, the identifier may be transmitted from the object to a sensor and/or analysis system. In either case, the identifier may be utilized to cross-reference stored data to match an identified object to a known object classification (e.g., "lawnmower", and/or Craftsman® CMXGMAM201101 21 in. 150 cc Gas Lawn Mower, available from Stanley Black & Decker, Inc. of New Britain, CT).

In some embodiments, the identification and/or classification of an object in the environment may be determined to be a safety hazard. Certain types and/or classes of objects may be deemed hazardous in accordance with stored rules and/or in accordance with a determination made by the applicable AI logic model, for example, such as the existence of an explosive, corrosive, and/or otherwise potentially dangerous substance and/or object. According to some embodiments, the identification of the safety hazard may depend upon a location of an identified and/or classified object. In some embodiments, a location computed and/or otherwise determined for a particular object may, for example, be utilized to calculate and/or derive estimated distances between one or more objects and one or more other objects, features, and/or locations. An identified object that is classified as an "exposed wire", for example, may be measured to derive a distance between the wire and the MR device and/or wearer thereof. Coordinate, point cloud, and/or wire-mesh model data descriptive of a location of an extent of the wire may be compared (e.g., subtracted and/or otherwise mathematically evaluated), for example, with respect to coordinate point cloud, and/or wire-mesh model data descriptive of the location of a body part of the wearer/user, to compute a distance therebetween. In some embodiments, one or more measurements may be provided and/or defined by the wearer/user. The wearer/user may measure a distance to the wire by utilizing a handheld pointer and/or LiDAR device, for example, and may provide the measurement data to the sensor/system.

According to some embodiments, the identifying of the safety hazard may comprise identifying (e.g., by the electronic processing device) a measurement and/or distance-related safety issue/hazard. One or more of the measurements and/or locations may be evaluated, for example, in accordance with stored rules and/or utilizing the AI model to define acceptable locations, orientations, settings, and/or positions of particular types (e.g., classifications) of objects to determine whether one or more objects are within acceptable ranges. In some embodiments, such rules may define ranges of acceptable distances between certain objects, such as the exposed wire in relation to the wearer/user. It may be acceptable in accordance with the rules, for example, for the exposed wire to be ten (10) feet away from the wearer, but any nearer may constitute the safety hazard. In the case that a measurement of such a distance based on the image/data from a sensor in (or proximate to) the environment is computed to be eight (8) feet, the particular measurement and/or associated object (or objects) may be flagged as being out of desirable safety bounds, thereby defining the safety hazard condition. In the case that an identified object is classified as a potentially deadly gas such as carbon dioxide, a necessary gas, such as oxygen, a temperature reading, etc., a reading that is outside of an acceptable range may trigger and/or comprise the safety hazard/condition.

In some embodiments, the method 600 may comprise outputting (e.g., by the electronic processing device) an indication of the safety hazard, at 626. The see-through display device and/or an interface generated, defined, and/or output thereof may, for example, output an indication of the safety hazard. In some embodiments, the indication may comprise a graphical element output via the interface of the see-through display device. According to some embodiments, the indication/graphical element may be provided in an MR and/or AR manner such that it appears to the wearer as being superimposed at the corresponding real-world location of the object associated with the safety hazard. In the example case of the identified/classified exposed wire, for example, a portion of the interface that corresponds to the exposed wire within the current gaze of the wearer/user may be highlighted in a red, glowing, and/or blinking color, include "alert" text, the current distance measurement, the distance safety threshold, etc. In such a manner, for example, the wearer/user may be alerted to the safety hazard and be provided with the most pertinent information for avoiding or remediating the hazard.

According to some embodiments, the interaction of the wearer/user with the MR device may cause an identification of the safety hazard and/or condition. The method 600 may comprise, for example, outputting a prompt (e.g., by the electronic processing device) requesting input from the wearer. In some embodiments, the MR/AR element output to indicate the safety hazard may comprise the prompt (e.g., after identifying a first safety issue). According to some embodiments, the prompt may be output prior to identifying a safety issue. In some embodiments, the method 600 may comprise (i) identifying (e.g., by the processing device) an amount of time that has elapsed since the outputting of the prompt, (ii) comparing (e.g., by the processing device) the amount of time that has elapsed since the outputting of the prompt to a stored threshold amount of time, (iii) determining (e.g., by the processing device) that the amount of time that has elapsed since the outputting of the prompt exceeds the stored threshold amount of time, and/or (iv) transmitting (e.g., via a wireless communication device) an alert. Wearer/user (e.g., fire investigator) attentiveness and/or responsiveness may, for example, be an indication of their health and/or safety condition. Failure to respond to an MR/AR safety check prompt, therefore, may constitute a safety hazard, e.g., that some other entity should be notified of.

In some embodiments, the identification of the safety hazard may comprise comparing an attribute of the wearer/user to an attribute of the environment. An attribute of the wearer/user may comprise a height, weight, width, stride length, etc., for example. According to some embodiments, an attribute of the environment may comprise a doorway width, ceiling height, estimated load capacity of a section of floor or ladder, etc. Comparing such attributes may, for example, enable the MR device to identify conditions that may cause injury, such as a ceiling that is too low and may cause the wearer/user to hit their head and/or a ladder or floor section that has an estimated load capacity that is not high enough to accommodate the wearer/user (e.g., based on their known or computed weight).

V. Mixed Reality (MR) and Artificial Intelligence (AI)-Enhanced Fire Investigation Apparatus, Articles of Manufacture, & Algorithms Turning to FIG. 7, a block diagram of an apparatus 710 according to some embodiments is shown. In some embodiments, the apparatus 710 may be similar in configuration and/or functionality to one or more of the user/MR devices 102, 202a-c, 302, 402, the controller device/server 110, 210, and/or the apparatus 710 of FIG. 1, FIG. 2, FIG. 3A, FIG. 4A, and/or FIG. 7 herein. The apparatus 710 may, for example, execute, process, facilitate, and/or otherwise be associated with the method/algorithm 600, 900 of FIG. 6 and/or FIG. 9 herein, and/or portions or combinations thereof. In some embodiments, the apparatus 710 may comprise a processing device 712, a communication device 714, an input device 716, an output device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 may be included in the apparatus 710 without deviating from the scope of embodiments described herein.

According to some embodiments, the processor 712 may be or include any type, quantity, and/or configuration of processor that is or becomes known. The processor 712 may comprise, for example, an Intel® IXP 2800 network processor or an Intel® XEON™ Processor coupled with an Intel® E7501 chipset. In some embodiments, the processor 712 may comprise multiple interconnected processors, microprocessors, and/or micro-engines. According to some embodiments, the processor 712 (and/or the apparatus 710 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 710 comprises a server, such as a blade server, necessary power may be supplied via a standard AC outlet, power strip, surge protector, and/or Uninterruptible Power Supply (UPS) device.

In some embodiments, the communication device 714 may comprise any type or configuration of communication device that is or becomes known or practicable. The communication device 714 may, for example, comprise a Network Interface Card (NIC), a telephonic device, a cellular network device, a router, a hub, a modem, and/or a communications port or cable. In some embodiments, the communication device 714 may be coupled to receive user input and/or sensor data, e.g., from a user device and/or a sensor device (not shown in FIG. 7). The communication device 714 may, for example, comprise a Bluetooth® Low Energy (BLE) and/or RF receiver device and/or a camera or other imaging device that acquires data from a user (not separately depicted in FIG. 7) and/or a transmitter device that provides the data to a remote server and/or server or communications layer (also not separately shown in FIG. 7). According to some embodiments, the communication device 714 may also or alternatively be coupled to the processor 712. In some embodiments, the communication device 714 may comprise an infrared (IR), RF, Bluetooth™, Near-Field Communication (NFC), and/or Wi-Fi® network device coupled to facilitate communications between the processor 712 and another device (such as a remote server device, not separately shown in FIG. 7).

In some embodiments, the input device 716 and/or the output device 718 are communicatively coupled to the processor 712 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., by a fire investigator to perform a fire and/or safety investigation analysis, as described herein). In some embodiments, the input device 716 may comprise a sensor, such as a camera, sound, light, and/or proximity sensor (e.g., of an MR headset system, such as one or more MR pointers and/or hand controls), configured to measure parameter values and report measured values via signals to the apparatus 710 and/or the processor 712. The output device 718 may, according to some embodiments, comprise a display screen and/or other practicable output component and/or device. The output device 718 may, for example, provide an interface (such as the interfaces 320, 420a-d, 520a-d of FIG. 3A, FIG. 4B, FIG. 4C, FIG. 4D, FIG. 4E, FIG. 5A, FIG. 5B, FIG. 5C, and/or FIG. 5D) via which functionality for MR/AI-based fire (and/or safety) investigation analysis is provided to a user (e.g., via a website and/or mobile device application). According to some embodiments, the input device 716 and/or the output device 718 may comprise and/or be embodied in a single device, such as a touch-screen monitor.

The memory device 740 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of 3-D modeling instructions 742-1, data embedding instructions 742-2, AI fire investigation instructions 742-3, AI safety analysis instructions 742-4, MR interface instructions 742-5, sensor data 744-1, positioning data 744-2, user data 744-3, and/or embedding data 744-4. In some embodiments, the 3-D modeling instructions 742-1, data embedding instructions 742-2, AI fire investigation instructions 742-3, AI safety analysis instructions 742-4, MR interface instructions 742-5, sensor data 744-1, positioning data 744-2, user data 744-3, and/or embedding data 744-4 may be utilized by the processor 712 to provide output information via the output device 718 and/or the communication device 714.

According to some embodiments, the 3-D modeling instructions 742-1 may be operable to cause the processor 712 to process the sensor data 744-1, positioning data 744-2, user data 744-3, and/or embedding data 744-4 in accordance with embodiments as described herein. Sensor data 744-1, positioning data 744-2, user data 744-3, and/or embedding data 744-4 received via the input device 716 and/or the communication device 714 may, for example, be analyzed, sorted, filtered, decoded, decompressed, ranked, scored, plotted, and/or otherwise processed by the processor 712 in accordance with the 3-D modeling instructions 742-1. In some embodiments, sensor data 744-1, positioning data 744-2, user data 744-3, and/or embedding data 744-4 may be fed by the processor 712 through one or more mathematical and/or statistical formulas and/or models in accordance with the 3-D modeling instructions 742-1 to merge generate and/or define a 3-D point cloud, 3-D wire-mesh model, and/or 3-D model of a location and/or environment, as described herein.

In some embodiments, the data embedding instructions 742-2 may be operable to cause the processor 712 to process the sensor data 744-1, positioning data 744-2, user data 744-3, and/or embedding data 744-4 in accordance with embodiments as described herein. Sensor data 744-1, positioning data 744-2, user data 744-3, and/or embedding data 744-4 received via the input device 716 and/or the communication device 714 may, for example, be analyzed, sorted, filtered, decoded, decompressed, ranked, scored, plotted, and/or otherwise processed by the processor 712 in accordance with the data embedding instructions 742-2. In some embodiments, sensor data 744-1, positioning data 744-2, user data 744-3, and/or embedding data 744-4 may be fed by the processor 712 through one or more mathematical and/or statistical formulas and/or models in accordance with the data embedding instructions 742-2 to join, associated, assign, and/or otherwise nest, layer, and/or embed data elements within and/or in association with a 3-D model, as described herein.

According to some embodiments, the AI fire investigation instructions 742-3 may be operable to cause the processor 712 to process the sensor data 744-1, positioning data 744-2, user data 744-3, and/or embedding data 744-4 in accordance with embodiments as described herein. Sensor data 744-1, positioning data 744-2, user data 744-3, and/or embedding data 744-4 received via the input device 716 and/or the communication device 714 may, for example, be analyzed, sorted, filtered, decoded, decompressed, ranked, scored, plotted, and/or otherwise processed by the processor 712 in accordance with the AI fire investigation instructions 742-3. In some embodiments, sensor data 744-1, positioning data 744-2, user data 744-3, and/or embedding data 744-4 may be fed by the processor 712 through one or more mathematical and/or statistical formulas and/or models in accordance with the AI fire investigation instructions 742-3 to identify, classify, score, rank, and/or analyze one or more objects within a fire-damaged environment, as described herein.

In some embodiments, the AI safety analysis instructions 742-4 may be operable to cause the processor 712 to process the sensor data 744-1, positioning data 744-2, user data 744-3, and/or embedding data 744-4 in accordance with embodiments as described herein. Sensor data 744-1, positioning data 744-2, user data 744-3, and/or embedding data 744-4 received via the input device 716 and/or the communication device 714 may, for example, be analyzed, sorted, filtered, decoded, decompressed, ranked, scored, plotted, and/or otherwise processed by the processor 712 in accordance with the AI safety analysis instructions 742-4. In some embodiments, sensor data 744-1, positioning data 744-2, user data 744-3, and/or embedding data 744-4 may be fed by the processor 712 through one or more mathematical and/or statistical formulas and/or models in accordance with the AI safety analysis instructions 742-4 to identify, classify, and/or cause an alert with respect to a safety hazard at a location and/or within an environment, as described herein.

According to some embodiments, the MR interface instructions 742-5 may be operable to cause the processor 712 to process the sensor data 744-1, positioning data 744-2, user data 744-3, and/or embedding data 744-4 in accordance with embodiments as described herein. Sensor data 744-1, positioning data 744-2, user data 744-3, and/or embedding data 744-4 received via the input device 716 and/or the communication device 714 may, for example, be analyzed, sorted, filtered, decoded, decompressed, ranked, scored, plotted, and/or otherwise processed by the processor 712 in accordance with the MR interface instructions 742-5. In some embodiments, sensor data 744-1, positioning data 744-2, user data 744-3, and/or embedding data 744-4 may be fed by the processor 712 through one or more mathematical and/or statistical formulas and/or models in accordance with the MR interface instructions 742-5 to generate and/or output various MR interface instances, MR elements, MR environments, and/or MR models, as described herein.

According to some embodiments, the apparatus 710 may comprise the cooling device 750. According to some embodiments, the cooling device 750 may be coupled (physically, thermally, and/or electrically) to the processor 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

Referring to FIG. 8A, FIG. 8B, FIG. 8C, FIG. 8D, and FIG. 8E, perspective diagrams of exemplary data storage devices 840*a-e* according to some embodiments are shown. The data storage devices 840*a-e* may, for example, be utilized to store instructions and/or data, such as the 3-D modeling instructions 742-1, data embedding instructions 742-2, AI fire investigation instructions 742-3, AI safety analysis instructions 742-4, MR interface instructions 742-5, sensor data 744-1, positioning data 744-2, user data 744-3, and/or embedding data 744-4, each of which is presented in reference to FIG. 7 herein. In some embodiments, instructions stored on the data storage devices 840*a-e* may, when executed by a processor, cause the implementation of and/or facilitate the method/algorithm 600, 900 of FIG. 6 and/or FIG. 9 herein, and/or portions or combinations thereof.

According to some embodiments, the first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 846, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 848*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, the second data storage device 840*b* may comprise a CD, CD-ROM, DVD, Blu-Ray™ Disc, and/or other type of optically-encoded disk and/or other storage medium that is or becomes know or practicable. In some embodiments, the third data storage device 840*c* may comprise a USB keyfob, dongle, and/or other type of flash memory data storage device that is or becomes know or practicable. In some embodiments, the fourth data storage device 840*d* may comprise RAM of any type, quantity, and/or configuration that is or becomes practicable and/or desirable. In some embodiments, the fourth data storage device 840*d* may comprise an off-chip cache, such as a Level 2 (L2) cache memory device. According to some embodiments, the fifth data storage device 840*e* may comprise an on-chip memory device, such as a Level 1 (L1) cache memory device.

The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media). The data storage devices 840*a-e* may generally store program instructions, algorithms, software engines, code, and/or modules that, when executed by a processing device cause a particular machine to function in accordance with one or more embodiments described herein.

Figure 9:
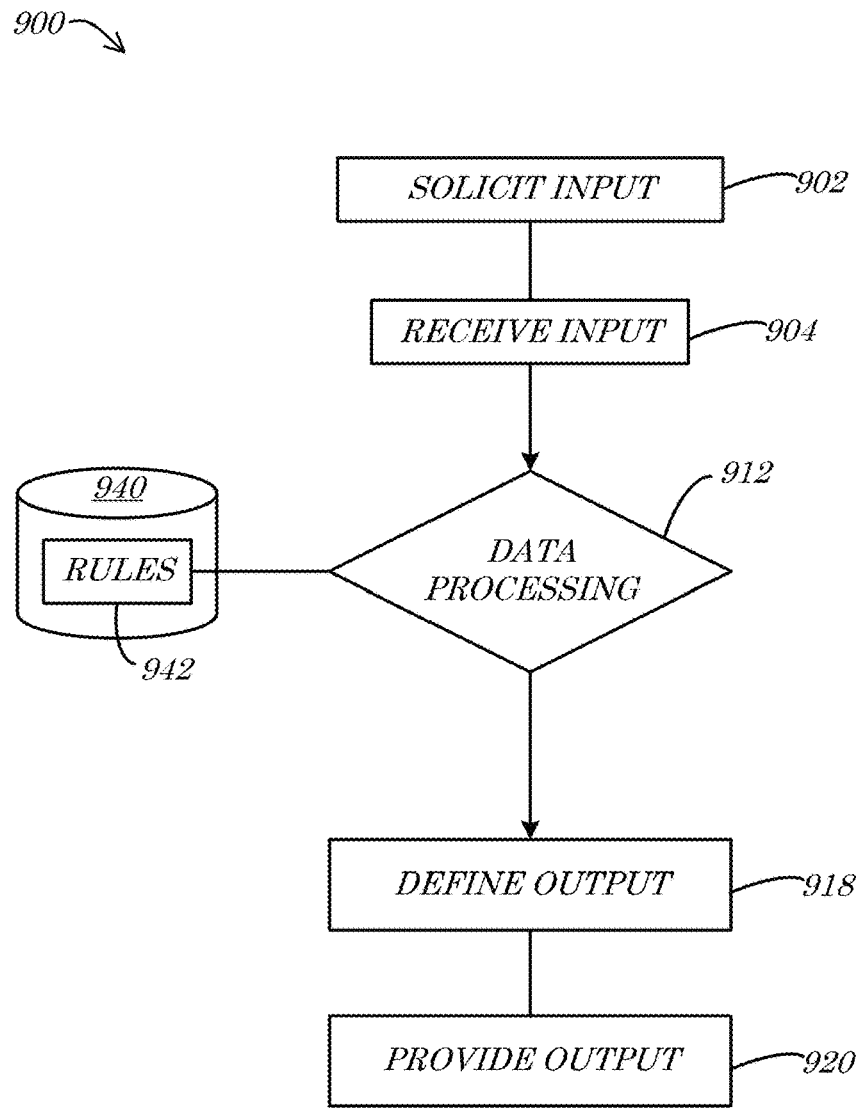
FIG. 9 is flowchart of an algorithm according to some embodiments.

With reference to FIG. 9, for example, the data storage devices 840*a-e* may store and/or define an algorithm 900. The algorithm 900 may comprise, for example, one or more software programs, modules, engines, and/or applications coded to perform any of the method/algorithm 600, 900 of FIG. 6 and/or FIG. 9 herein, and/or portions or combinations thereof. The algorithm 900, and any reference to the term "algorithm" herein, refers to any set of defined instructions that operate upon input to define and/or provide output. The algorithm 900 may, for example, be specifically programmed and/or otherwise defined to instruct a computer or other device (not shown) to solve a particular problem (e.g., logical) and/or resolve a particular mathematical calculation (e.g., arithmetic). In some embodiments, the algorithm 900 may be written and/or defined as a series or sequence of instructions encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device, such as a CPU).

According to some embodiments, the algorithm 900 may comprise soliciting input, at 902. Input from one or more sources may be searched for and/or queried, by structuring and/or executing a database query and/or by sending a data communication signal or "handshake", such as is common with Bluetooth® short-range communication protocols. In some embodiments, the algorithm 900 may comprise receiving the input, at 904. Whether solicited or otherwise provided and/or acquired (e.g., loaded and/or downloaded), for example, the input for the algorithm 900 may be received, identified, and/or otherwise processed and/or located. According to some embodiments, the algorithm 900 may comprise data processing, at 912. The data processing 912 may, for example, comprise execution of one or more logical and/or computational procedures, modules, scripts, and/or routines that may be stored in a memory device 940 (e.g., similar to the data storage devices 840*a-e*) as a set of instructions or rules 942 and/or that may be defined and/or implemented by one or more electrical, mechanical, and/or physical components, such as logic gates, diodes, transistors, relays, and/or switches (e.g., operable to execute the method 600 of FIG. 6 herein, and/or portions thereof).

In some embodiments, execution of the algorithm 900 may comprise a loading of the rules 942 into the memory 940 and/or into an electronic processing system (not shown) and/or an activation of one or more logic gates and/or other electrical and/or mechanical components. The algorithm 900 may operate upon the input in accordance with the rules 942 to achieve a result by defining output, at 918. The algorithm 900 may, for example, generate, produce, define, identify, calculate, and/or otherwise compute output based on an application of the data processing 912 utilizing the rules 942 and any or all input receiving at 904. According to some embodiments, the algorithm 900 may comprise providing the output, at 920. One or more output devices (not shown) may be utilized to convey the output (e.g., a result, conclusion, decision, etc.) to one or more other devices and/or entities (not shown), such as one or more users, fire and/or safety investigators, and/or devices utilized thereby. The output may be displayed via an electronic display screen of a computer, mobile/smart phone, MR device, smart watch, etc., and/or may be transmitted as one or more electronic signals to one or more network destination addresses, such as e-mail addresses, URL locations, MAC addresses, and/or broadcast radio frequencies.

According to some embodiments, the data processing at 912 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 900 may partially or completely comprise, for example, instructions and/or steps that are well known, such as steps and/or instructions operable to calculate an area (length times width), volume (length times width times height), distance (difference between two locations), velocity (distance over time), acceleration (velocity over time), and/or any other known mathematical and/or logical (if/then statements) procedures. For any and all known procedures and/or instructions, the discrete details of such instructions are represented by the data processing at 912 and are not listed herein as one of ordinary skill in the art would readily comprehend both what such technological knowledge entails and that the inventor has possession of such knowledge. Instructions that may be included within and/or comprise the data processing at 912 (and/or the algorithm 900) may include, for example, but are not limited to, any known or practicable: (i) data transmission protocol algorithms, (ii) 3-D model construction and/or generation algorithms, (iii) MR input and/or output algorithms, (iv) AI and/or ML data input classification algorithms, (v) data conversion algorithms, (vi) data encoding algorithms, (vii) data decoding algorithms, (viii) logical and/or mathematical data comparison algorithms, and (ix) data searching (e.g., keyword searching) algorithms.

VI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

As utilized herein, the terms "high-resolution" and "low-resolution" may be relative in nature, meaning that, e.g., an image with high-resolution has a higher resolution (i.e., a higher concentration of pixels or dots, or more pixels per inch (ppi) or dots per inch (dpi) than an image with low-resolution. In some embodiments, low-resolution, with respect to images, may refer to images with less than three hundred pixels per inch (<300 ppi). According to some embodiments, high-resolution, with respect to images, may refer to images with greater than or equal to three hundred pixels per inch (>=300 ppi).

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more". This rule applies even within the body of a claim where a first instance of an element utilizes "a" or "an" and a second or subsequent instance of the element necessarily utilizes (e.g., for purposes of proper grammar and required antecedent basis) the definite article "the" to refer to the element. The use of the definite article "the" does not limit the element to a single object merely because it is utilized to refer back to a previous mention of the element. The original reference to the element controls with respect to the plurality (or lack thereof) of the element.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002@ published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system for Mixed Reality (MR) and Artificial Intelligence (AI)-enhanced fire investigation, comprising:
   a sensor device; and
   an MR device in wireless communication with the sensor device, the MR device, comprising:
      a processing device;
      a wireless communication device in communication with the processing device and in selective communication with the sensor device;
      a head-mounted see-through display in communication with the processing device;
      a Time of Flight (ToF) sensor in communication with the processing device;
      a camera in communication with the processing device;
      one or more Inertial Measurement Unit (IMU) devices in communication with the processing device;
      a battery in communication with the processing device; and
      a memory device in communication with the processing device, the memory device storing MR instructions that when executed by the processing device, result in:
         acquiring, by the ToF sensor and at a first time and from a first location in an environment in which a wearer of the head-mounted see-through display is located, data descriptive of first distances from the MR device to a first plurality of surface points in the environment, wherein the first plurality of surface points are within a first field of view of the camera;
         computing, by the processing device and utilizing the first distances and the first location, a first portion of a 3-D point cloud descriptive of locations of the first plurality of surface points in the environment;
         tracking, after the acquiring of the first distances and by the one or more IMU devices, a first movement of the wearer from the first location in the environment to a second location in the environment;
         acquiring, by the ToF sensor and at a second time and from the second location in the environment, data descriptive of second distances from the MR device to a second plurality of surface points in the environment, wherein the second plurality of surface points are within a second field of view of the camera;
         computing, by the processing device and utilizing the second distances and the second location, a second portion of the 3-D point cloud descriptive of locations of the second plurality of surface points in the environment;
         generating, by the processing device and utilizing the first and second portions of the 3-D point cloud, a 3-D wire mesh model descriptive of the environment;

receiving, by the wireless communication device and from the sensor device, (i) data descriptive of the environment that has been captured by the sensor device and (ii) positioning information descriptive of a location and orientation of the sensor device;

identifying, by the processing device and based on the positioning information descriptive of a location and orientation of the sensor device, a portion of the 3-D wire mesh model that corresponds to the data descriptive of the environment that has been captured by the sensor device; and assigning, by the processing device and to the corresponding portion of the 3-D wire mesh model, an attribute representative of the data descriptive of the environment that has been captured by the sensor device.

2. The system for MR and AI-enhanced fire investigation of claim 1, wherein the sensor device comprises a camera and wherein the data descriptive of the environment that has been captured by the sensor device comprises one or more images.

3. The system for MR and AI-enhanced fire investigation of claim 2, wherein the MR instructions, when executed by the processing device, further result in:

projecting, by the processing device, the one or more images onto the corresponding portion of the 3-D wire mesh model.

4. The system for MR and AI-enhanced fire investigation of claim 2, wherein the MR instructions, when executed by the processing device, further result in:

identifying, by the processing device and for each portion of the one or more images, a corresponding portion of the 3-D wire mesh model; and assigning, by the processing device and to each corresponding portion of the 3-D wire mesh model, a texture attribute representative of the corresponding portion of the one or more images.

5. The system for MR and AI-enhanced fire investigation of claim 2, wherein the environment comprises an interior of a fire-damaged structure and wherein the one or more images comprises imagery descriptive of fire damage.

6. The system for MR and AI-enhanced fire investigation of claim 1, wherein the sensor device comprises a DSLR camera and wherein the data descriptive of the environment that has been captured by the sensor device comprises one or more high-resolution images.

7. The system for MR and AI-enhanced fire investigation of claim 6, wherein the MR instructions, when executed by the processing device, further result in:

identifying, by the processing device and for each portion of the one or more high-resolution images, a corresponding portion of the 3-D wire mesh model; and assigning, by the processing device and to each corresponding portion of the 3-D wire mesh model, an attribute representative of the corresponding portion of the one or more high-resolution images.

8. The system for MR and AI-enhanced fire investigation of claim 7, wherein the MR instructions, when executed by the processing device, further result in:

outputting, via the head-mounted see-through display and to the wearer, an MR element that is indicative of the one or more high-resolution images, wherein the MR element is output such that it appears to be positioned in the environment at a location of the corresponding portion of the 3-D wire mesh model.

9. The system for MR and AI-enhanced fire investigation of claim 8, wherein the MR instructions, when executed by the processing device, further result in:

receiving, from the wearer, an indication of a selection of the MR element; and outputting, to the wearer and in response to the receiving, the one or more high-resolution images.

10. The system for MR and AI-enhanced fire investigation of claim 1, wherein the sensor device comprises a LiDAR device and wherein the data descriptive of the environment that has been captured by the sensor device comprises one or more distance measurements.

11. The system for MR and AI-enhanced fire investigation of claim 10, wherein the MR instructions, when executed by the processing device, further result in:

identifying, by the processing device and for each portion of the one or more distance measurements, a corresponding portion of the 3-D wire mesh model;

computing, by the processing device, a difference between (i) a distance between the portion of the 3-D wire mesh model and the location of the sensor LiDAR device and (ii) the one or more distance measurements; and computing, by the processing device and based on the difference, an error metric for the location of the corresponding portion of the 3-D wire mesh model.

12. A system for Mixed Reality (MR) and Artificial Intelligence (AI)-enhanced fire investigation, comprising:

an MR device, comprising:
a processing device;
a head-mounted see-through display in communication with the processing device;
a Time of Flight (ToF) sensor in communication with the processing device;
a camera in communication with the processing device;
one or more Inertial Measurement Unit (IMU) devices in communication with the processing device;
a battery in communication with the processing device; and
a memory device in communication with the processing device, the memory device storing (i) an AI safety criteria model and (ii) MR instructions that when executed by the processing device, result in:

acquiring, by the ToF sensor and at a first time and from a first location in an environment in which a wearer of the head-mounted see-through display is located, data descriptive of first distances from the MR device to a first plurality of surface points in the environment, wherein the first plurality of surface points are within a first field of view of the camera;

computing, by the processing device and utilizing the first distances and the first location, a first portion of a 3-D point cloud descriptive of locations of the first plurality of surface points in the environment;

tracking, after the acquiring of the first distances and by the one or more IMU devices, a first movement of the wearer from the first location in the environment to a second location in the environment;

acquiring, by the ToF sensor and at a second time and from the second location in the environment, data descriptive of second distances from the MR device to a second plurality of surface points in the environment, wherein the second plurality of surface points are within a second field of view of the camera;

computing, by the processing device and utilizing the first distances and the second location, a second portion of the 3-D point cloud descriptive of locations of the second plurality of surface points in the environment;

generating, by the processing device and utilizing the first and second portions of the 3-D point cloud, a 3-D wire mesh model descriptive of the environment;

identifying, by the processing device and by an execution of the AI safety criteria model, a safety hazard in the environment; and outputting, via the head-mounted see-through display and to the wearer, an MR element that is indicative of the safety hazard.

13. The system for MR and AI-enhanced fire investigation of claim 12, wherein the MR element comprises a prompt requesting input from the wearer and wherein the MR instructions, when executed by the processing device, further result in:

identifying, by the processing device, an amount of time that has elapsed since the outputting of the prompt;

comparing, by the processing device, the amount of time that has elapsed since the outputting of the prompt to a stored threshold amount of time;

determining, by the processing device, that the amount of time that has elapsed since the outputting of the prompt exceeds the stored threshold amount of time; and transmitting, via a wireless communication device, an alert.

14. The system for MR and AI-enhanced fire investigation of claim 12, wherein the identifying, by the processing device and by the execution of the AI safety criteria model, of the safety hazard in the environment, comprises:

identifying an attribute of the wearer;

comparing the attribute of the wearer to the 3-D wire mesh model descriptive of the environment; and identifying, based on the comparing, a conflict between the attribute of the wearer and at least one portion of the 3-D wire mesh model.

15. The system for MR and AI-enhanced fire investigation of claim 14, wherein the attribute of the wearer comprises at least one of a height and width of the wearer.

16. The system for MR and AI-enhanced fire investigation of claim 12, wherein the safety hazard comprises an excessive thermal reading.

17. The system for MR and AI-enhanced fire investigation of claim 12, wherein the safety hazard comprises at least one of an oxygen and a carbon dioxide reading that falls outside of a respective acceptable range.

18. The system for MR and AI-enhanced fire investigation of claim 12, wherein the safety hazard comprises an exposed electrical wire.

* * * * *